(12) United States Patent
Jessup et al.

(10) Patent No.: US 6,582,015 B2
(45) Date of Patent: Jun. 24, 2003

(54) SEAT AND OCCUPANT RESTRAINT SYSTEM WITH ADAPTABLE ACTUATOR

(76) Inventors: Chris P. Jessup, 20880 Mulebarn Rd., Sheridan, IN (US) 46069; Douglas Wayne Bittner, 5420 Susan Dr. East, Indianapolis, IN (US) 46250

( * ) Notice: Subject to any disclaimer, the term of this patent is extended or adjusted under 35 U.S.C. 154(b) by 87 days.

(21) Appl. No.: 09/912,178

(22) Filed: Jul. 24, 2001

(65) Prior Publication Data

US 2002/0021041 A1 Feb. 21, 2002

Related U.S. Application Data

(60) Provisional application No. 60/226,071, filed on Aug. 17, 2000.

(51) Int. Cl.[7] .............................. B60N 2/42; B60R 21/00
(52) U.S. Cl. .................. 297/216.17; 297/480; 296/68.1
(58) Field of Search .............................. 297/216.7, 480, 297/468, 216.19, 216.2, 216.16; 296/68.1

(56) References Cited

U.S. PATENT DOCUMENTS

| | | | |
|---|---|---|---|
| 4,015,860 A | * | 4/1977 | Tisell et al. ................. 297/480 |
| 5,015,010 A | | 5/1991 | Homeier et al. |
| 5,219,207 A | | 6/1993 | Anthony et al. |
| 5,451,094 A | | 9/1995 | Templin et al. |
| RE37,123 E | | 4/2001 | Templin et al. |
| 6,322,140 B1 | * | 11/2001 | Jessup et al. .......... 297/216.17 |

* cited by examiner

Primary Examiner—Anthony D. Barfield
(74) Attorney, Agent, or Firm—Woodard, Emhardt, Moriarty, McNett & Henry LLP

(57) ABSTRACT

A restraint system for moving a vehicle seat and occupant toward the vehicle floor. Fluid cylinders or rotary spoolers are mounted to the seat and have respectively a pair of extendable piston rods or rotary outputs connected via rods or flexible members to a cable slidably mounted to the seat with one cable end connected to the buckle of a three point belt assembly mounted to the seat and an opposite end connected to one end of the lap portion of the belt assembly. Activation causes the cable to be pulled tensioning the belt assembly and application of downward pressure to the seat.

12 Claims, 18 Drawing Sheets

SEAT AND OCCUPANT RESTRAINT SYSTEM WITH ADAPTABLE ACTUATOR

Applicant claims the benefit under 35 USC 119(e) of U.S. Provisional Application Ser. No. 60/226,071, filed Aug. 17, 2000.

BACKGROUND OF THE INVENTION

1. Field of the Invention

This invention is in the field of tethers, harnesses, and other restraint systems used in vehicles.

2. Description of the Prior Art

A variety of different types of restraint systems have been devised for securing passengers, cargo and seats within a vehicle. For example, the commonly owned U.S. Pat. No. 5,015,010 discloses a tether securing a seat frame to a vehicle floor, a three point belt system entirely mounted to the seat frame restraining the seat occupant, and a retractor belt combination extending between the vehicle floor and the top of the seat isolating the seat back from passenger force exerted against the seat belt.

In order to limit suspension seat movement during a crash, it has been the practice to tether the seat to the floor; however, a fixed tether limits the horizontal adjustability of the seat. In the commonly owned U.S. Pat. No. 5,219,207, an automatic locking tether for the vehicle seat is disclosed wherein the seat may be horizontally adjusted to the specific requirement of the occupant. Passenger loading during a crash results in the automatic locking of the tether.

Seats provided within large vehicles, such as, trucks typically are suspendedly mounted atop the vehicle floor. For example, a cushioned air bag may be positioned between the bottom of the seat and floor thereby providing a cushioned ride. Such seats are typically positioned a substantial distance from the vehicle floor. It is therefore desirable to provide a restraint system, such as disclosed in the commonly owned U.S. Pat. No. 5,451,094 and U.S. RE Pat. No. 37,123 E that will move the seat and occupant toward the floor during a crash thereby providing a more compact seat occupant envelope. It is desirable to provide flexibility in locating such a system for moving the seat and occupant toward the floor to allow use with various seating arrangements. Disclosed here is a system allowing various mounting arrangements.

SUMMARY OF THE INVENTION

One embodiment of the present invention is a seat restraint system mountable to a vehicle comprising a seat and a suspension which is connected to the seat and for mounting to a vehicle floor operable to allow the seat to move to and from the vehicle floor. A belt is mounted to the seat to restrain an occupant on the seat. The belt has a first end portion and a second end portion with a first locking portion mounted therebetween and to the belt. The belt further includes a second locking device lockingly engageable and mateable with the first locking device. A seat retractor has a flexible portion connected to the seat and moves the seat toward the vehicle floor upon crash.

It is an object of the present invention to provide a compact restraint system for a vehicle seat and occupant.

A further object of the present invention is to provide a restraint system for moving a vehicle suspension seat towards the vehicle floor during a crash with the system allowing use with various seating arrangements.

An additional object of one embodiment of the present invention is to provide a restraint system operable upon crash of the vehicle to both tighten the seat belt and move the seat with occupant towards the vehicle floor.

Related objects and advantages of the present invention will be apparent from the following description.

DESCRIPTION OF PREFERRED EMBODIMENTS

Figure 1:
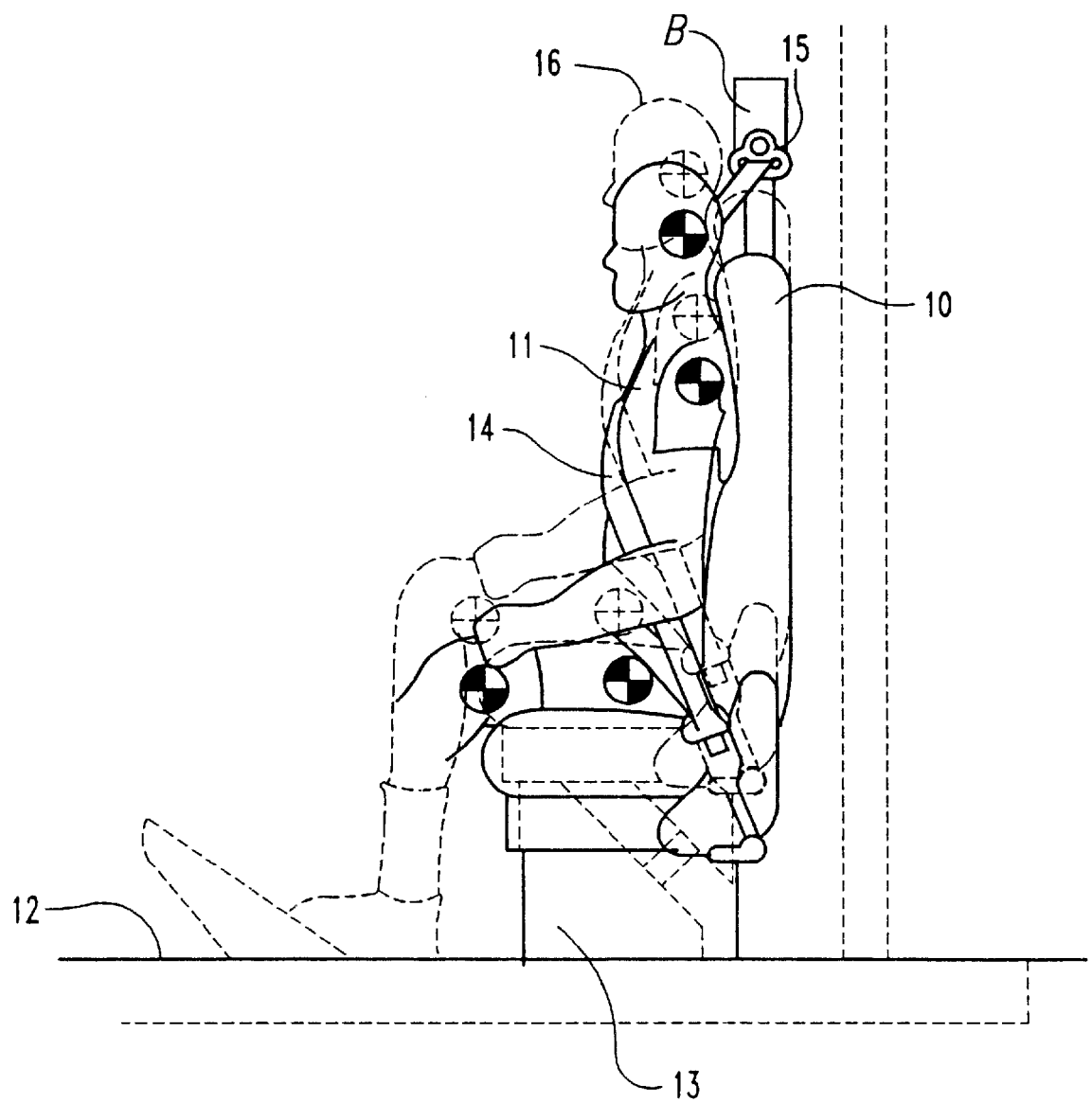
FIG. 1 is a side view of a vehicle seat showing vertical excursion.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 depicts a typical suspension seat 10 utilized in a large vehicle, such as a truck. Seat 10 is mounted by means of an air bag within housing 13 atop vehicle floor 12. Occupant 11 is secured within the seat by means of a conventional three point belt assembly 14 with the belt extending through a D-loop 15 mounted to the B pillar of the truck. One end of the belt is secured to a retractor mounted either directly to the vehicle or to the frame of the seat. Dash line 16 depicts the upper limit of the vertical movement of the occupant. The amount of vertical movement will vary with each type of seat; however, a typical seat has a vertical movement of approximately four to six inches unless the vehicle rolls over in which case the vertical movement of the occupant may increase to approximately nine inches when the vehicle is in an upside-down condition.

Figure 3:
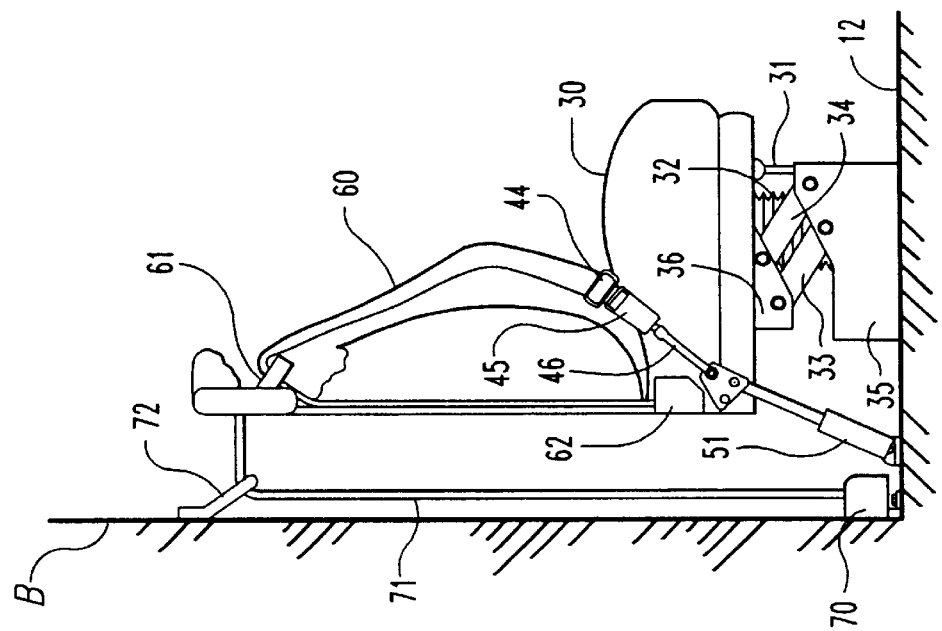
FIG. 3 is a side view of a fourth alternate embodiment of the seat incorporating the present invention.
Figure 2:
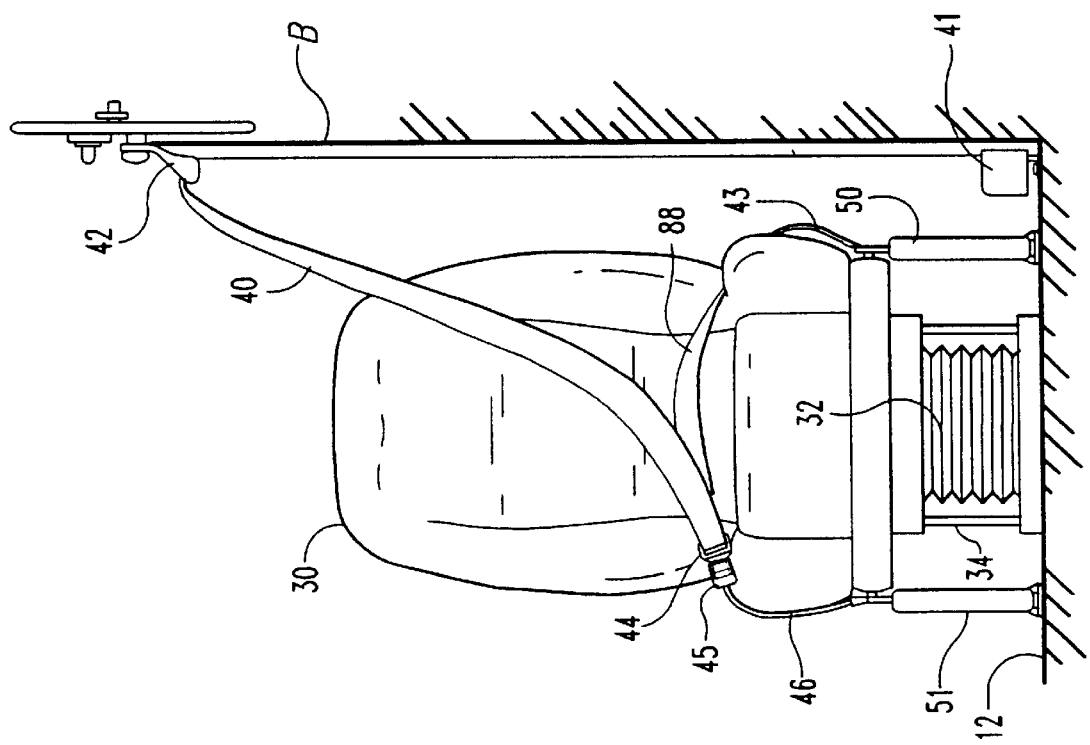
FIG. 2 is a front view of a third alternative embodiment of the seat incorporating the present invention.

FIGS. 2 and 3 illustrate respectively the third and fourth alternative embodiments of the restraint systems incorporating the present invention. Seats 30 of FIGS. 2 and 3 are identical except in FIG. 2 the retractor and D-loop used with the seat belt are mounted external of the seat, whereas in FIG. 3 the D-loop and associated retractor are mounted directly to the seat. In FIG. 3 an additional retractor and associated belt are used to isolate the seat back from passenger force applied to the belt during a crash. The restraint systems incorporating the present invention for moving the seat and occupant toward the vehicle flow are identical for use with the seats of FIGS. 2 and 3.

The conventional truck suspension vehicle seat includes an air spring, fluid bag or mechanical spring 32 (FIG. 3) positioned between the bottom of the seat frame and vehicle floor 12. A pair of links 33 and 34 have their opposite ends pivotally mounted to depending brackets 36 attached to the seat frame and an upwardly extending bracket 35 mounted atop floor 12. Links 33 and 34 and brackets 35 and 36 are provided on each side of the seat allowing the seat to move vertical in a controlled manner. The front end and rear end of the seat typically move simultaneously, allowing the seat to move in its entirety. A conventional shock absorbing telescoping device 31 is fixed to and extends between the bottom of the seat frame and bracket 35. Device 31 is not shown in FIG. 2 to more clearly illustrate spring 32. The occupant may adjust the height of the seat by controlling the fluid pressure to spring 32. Conventional fluid or spring controls are provided connecting the air bag to a source of pressurized fluid such as air or adjusting the spring.

A three point belt assembly 40 (FIG. 2) has one end of the belt attached to retractor 41 mounted to the vehicle floor with the belt then extending upwardly through a D-loop 42 mounted to the vehicle B pillar. The belt extends downwardly from D-loop 42 across the occupant and slidably through a conventional seat belt tongue 44 with the belt then extending from the tongue across the lap of the occupant with the opposite end 43 of the belt 88 connected to the restraint device 50 incorporating the present invention. A conventional seat belt buckle 45 is releasably lockable with tongue 44 and is mounted to a strap or other extending member 46, in turn, having its opposite end connected to restraint device 51. Restraint devices 50 and 51 are identical and are operable to pull the three-point belt assembly 40 and seat downwardly in the crash mode.

The three point belt assembly 60 shown in FIG. 3 is identical to the three point belt assembly 40 with the exception that D-loop 61 is mounted directly to the back of the seat as contrasted to the mounting of D-loop 42 to the B pillar. Further, one end of the belt utilized in the three point belt assembly 60 is connected to retractor 62 mounted directly to the seat frame. Thus, in the embodiment shown in FIG. 3, the belt extends upwardly from retractor 62 through D-loop 61 and then downwardly across the occupant with the belt then slidably extending through tongue 44 with the opposite end of the belt being attached to a restraint device 50 positioned on the opposite side of the seat from that depicted in FIG. 3. Likewise, buckle 45 in FIG. 3 is connected to a belt, cable 46 or other elongated device, in turn, connected to restraint device 51. A three point belt assembly and D-loop, wherein the D-loop is mounted to the B pillar but the retractor for the three point belt assembly is mounted directly to the seat frame is disclosed in the commonly owned U.S. Pat. No. 5,176,402 which is herein incorporated by reference.

In FIG. 3, an additional retractor 70 is mounted directly to the vehicle having a belt 71 which extends upwardly through guide 72 affixed to the B pillar with the end of the belt attached to D-loop 61 such as shown in the commonly owned U.S. Pat. No. 5,015,010 which is herewith incorporated by reference. Retractor 70 is therefore operable to isolate the seat back from the forces exerted by the passenger against the three point belt assembly 60 by directing the forces directly from the belt to D-loop 61 and then via belt 71 to the vehicle instead of directing the force to the back of the seat for absorption. In an alternate embodiment retractor 70 and guide 72 are not used.

Figure 4:
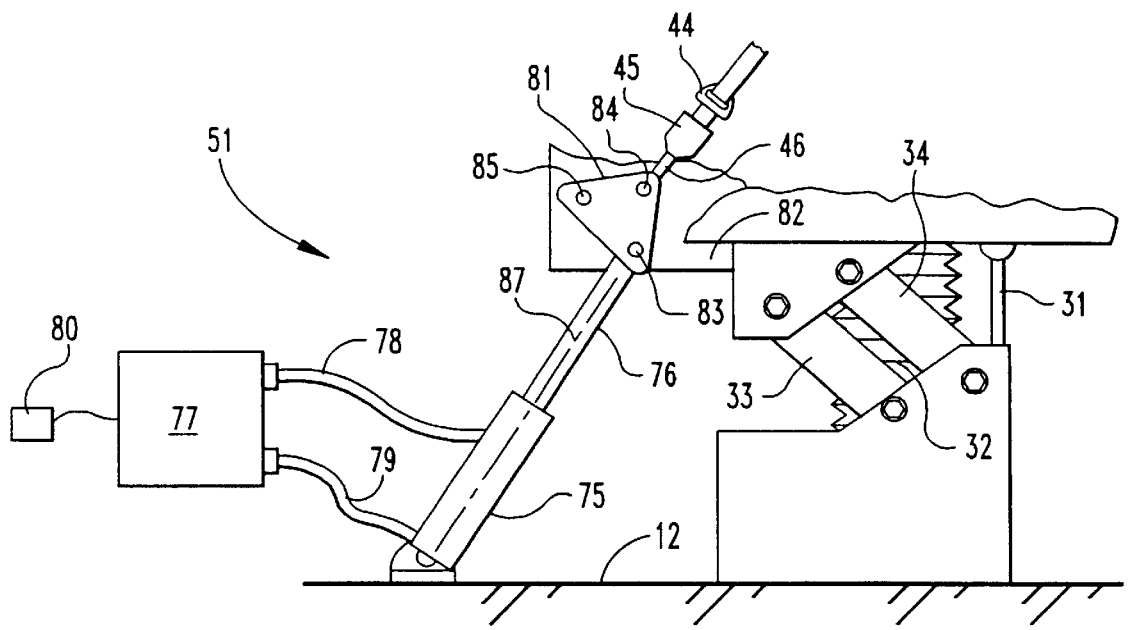
FIG. 4 is an enlarged fragmentary view of the seat of FIG. 3 in a normal mode.
Figure 5:
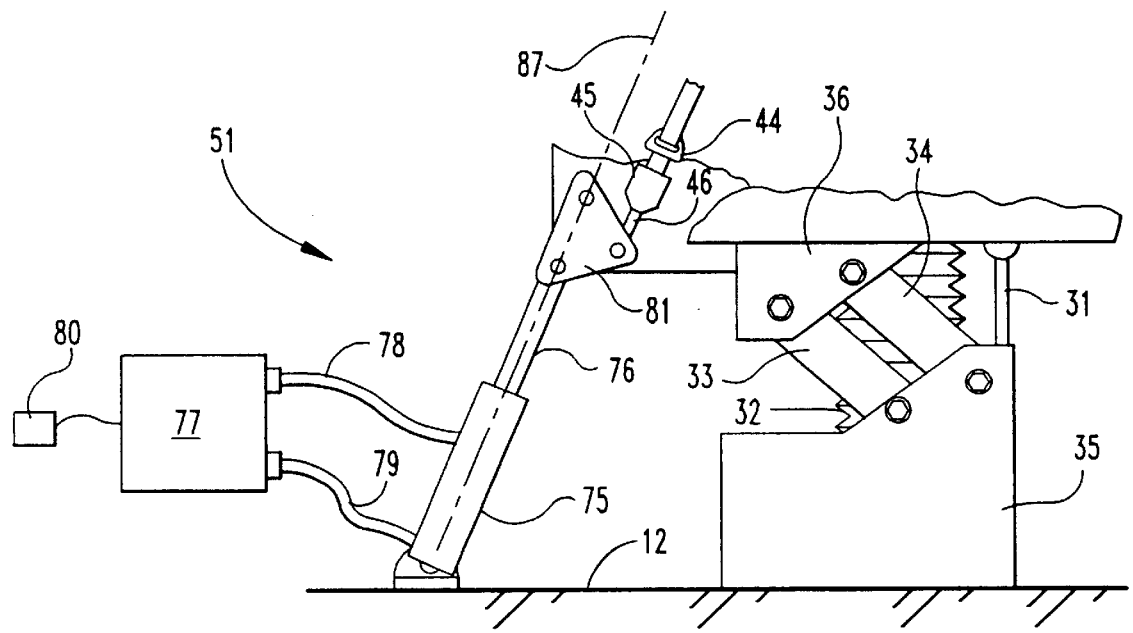
FIG. 5 is the same view as FIG. 4 only showing the seat in a crash mode.
Figure 6:
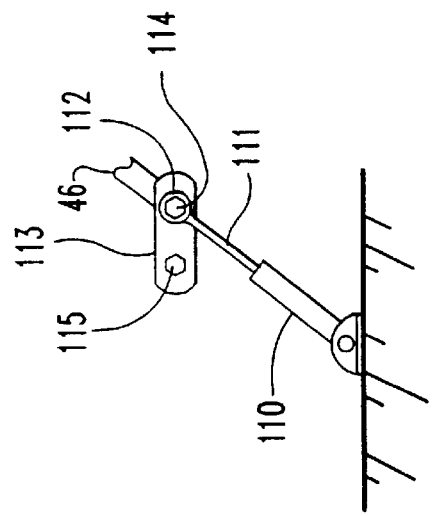
FIGS. 6–9 are side diagrammatic views of various alternate linkages for the seat of FIGS. 2 and 3.
Figure 7:
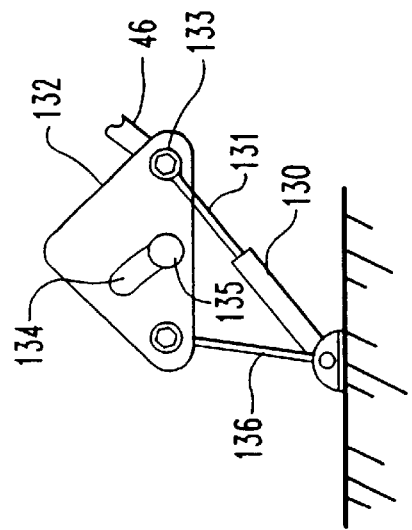
Figure 8:
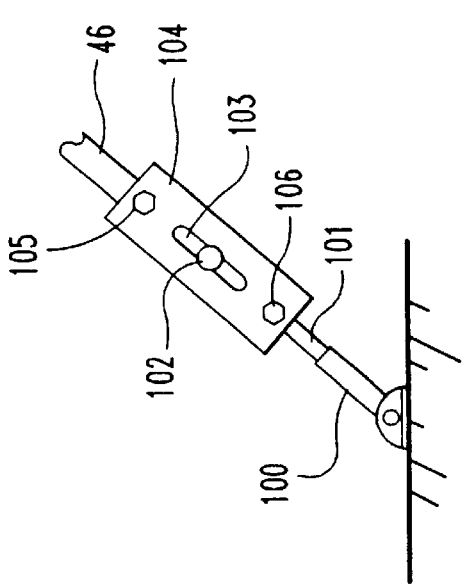
Figure 9:
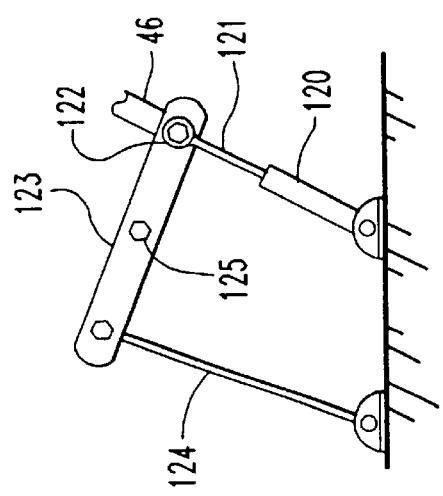

Restraint devices 50 and 51 are identical and thus the following description for restraint device 51 will apply equally to device 50. Restraint device 51 is depicted in FIG. 4 in the normal mode and in FIG. 5 in the crash mode. The restraint device includes a fluid cylinder 75 pivotally mounted to vehicle floor 12. The cylinder has an extendable and retractable piston rod 76 with cylinder 75 connected to a source of pressurized fluid 77 via fluid lines 78 and 79. A conventional crash sensor 80, operably to detect motion changes, a frontal crash or a rollover event, is connected via conventional circuitry to source 77 and is operable when the vehicle crashes to detect changes in velocity or a rollover, activating the source of pressurized fluid 77 and causing cylinder 75 to retract piston rod 76.

The outer distal end of piston rod 76 is pivotally mounted by pivot joint 83 to a timing plate 81 pivotally mounted by pivot joint 85 to seat frame 82. Seat belt buckle 45 is connected by member 46 by pivot joint 84 to timing plate 81. Prior to crash, pivot joint 85 is located at a position spaced apart from axis 87 (FIG. 4) which extends along the length of pivot rod 76. Once sensor 80 has detected a change in vehicle velocity, piston rod 76 is retracted thereby pivoting timing plate 81 in a clockwise direction, as viewed in FIG. 4, about pivot joint 85 until pivot joint 85 is located on axis 87. As plate 81 moves from the position of FIG. 4 to the position of FIG. 5, buckle 45, tongue 44 and the three-point belt assembly will be pulled downwardly and tightened thereby moving the occupant downwardly into the cushion of the seat. Simultaneously, the opposite end 43 (FIG. 2) of the lap portion 88 of the belt is pulled downwardly by restraint device 50 and retractor 41 or 62 lock preventing further extension of the belt. Even though retractors 41 and 62 have locked, the retracting devices 50 and 51 will pull the occupant and seat downwardly towards the vehicle floor since the belt in the three point belt assembly will stretch and further due to the normal slack existing in the three point belt assembly. Once plate 81 has pivoted to the position depicted in FIG. 5, pivot joint 85 is located on axis 87 and further retraction of rod 76 will pull seat frame 82 downwardly toward the vehicle floor. Various timing linkages are possible in addition to the timing plate 81. Such alternate linkages are depicted in FIGS. 6–9.

Fluid cylinder 100 (FIG. 6) is pivotally mounted to the vehicle floor and has an extendable and retractable piston rod 101 with a distal end 106 pivotally connected to plate 104. Buckle 45 is connected to member 46 in turn pivotally connected by joint 105 to plate 104. Buckle 45 along with sensor 80 and the source of pressurized fluid 77 have not been shown in FIGS. 6–9; however, it is to be understood that the buckle and source of pressurized fluid are connected respectively to member 46 and the fluid cylinder in a manner similar to that depicted in FIG. 4. Projection 102 is fixedly mounted to seat frame 82 and is slidable within slot 103 of plate 104. Retraction of rod 101 causes end 106 and plate 104 to move downwardly thereby pulling downward buckle 45 and the attached three point belt assembly. Eventually, projection 102 will reach the top end of slot 103 thereby transferring the downward pull to seat frame 82 forcing the seat downward. Plate 104 is pivotally mounted to projection 102 allowing the buckle to be positioned conveniently with respect to the seat occupant.

Fluid cylinder 110 (FIG. 7) is pivotally mounted to the vehicle floor and has an extendable piston rod 111 with a distal end 112 pivotally connected to linkage 113. End 112 of rod 111 is positioned at one end of linkage 113 and is also connected via pivot joint 114 to member 46, in turn, attached to buckle 45. The opposite end of linkage 113 is connected via pivot joint 115 to seat frame 82. Retraction of rod 111 results in the downward movement of pivot joint 114 and member 46 along with the three point belt assembly pulling the occupant downward until eventually linkage 113 has pivoted sufficiently clockwise to align pivot joints 114 and 115 with the longitudinal axis of rod 111 thereby transferring the downward force to seat frame 82 and pulling the seat downwardly towards the floor.

Fluid cylinder 120 (FIG. 8) is pivotally mounted to the vehicle floor and has an extendable piston rod 121 with an outer distal end 122 pivotally connected to one end of linkage 123 with the opposite end of the linkage tethered to the vehicle floor by means of cable or web 124. Linkage 123 is pivotally mounted to the seat extension 82 via pivot joint 125 whereas member 46 attached to buckle 45 is pivotally connected to the distal end 122 of piston rod 121. Thus, retraction of piston rod 121 results in the clockwise rotation of linkage 123 about pivot joint 125 until cable 124 assumes a taut condition. Prior to cable 124 becoming taut, retraction of piston rod 121 will pull the three-point buckle assembly downward. Once cable 124 is taut, further retraction of piston rod 121 will result in the downward force being applied to pivot joint 125 pulling the seat downwardly.

Fluid cylinder 130 (FIG. 9) is pivotally mounted to the vehicle floor and has an extendable piston rod 131 with an outer end 133 pivotally connected to plate 132 having a slot 134 through which projection 135 extends. Projection 135 is fixedly mounted to seat extension 82 and is slidable along the length of slot 134. The opposite end of plate 132 is connected to the vehicle floor by means of rigid member 136. Member 46 connected to buckle 45 is pivotally connected to the distal end 133 of piston rod 131. Thus, retraction of piston rod 131 results in downward force being applied to the buckle thereby pulling downward the three point buckle assembly until eventually plate 132 moves sufficiently positioning projection 135 at the upper end of slot 134. Further retraction of piston rod 131 thereby transfers the downward pull to projection 135 and the seat frame resulting in the seat being pulled downwardly toward the floor. As shown in FIG. 2, the seat is equipped with a restraint device 50 and 51 on the opposite sides of the seat. Thus, the fluid cylinders and accompanying linkages depicted in FIGS. 6–9 are positioned on each side of the seat in a manner similar to that depicted in FIG. 2.

Figure 10:
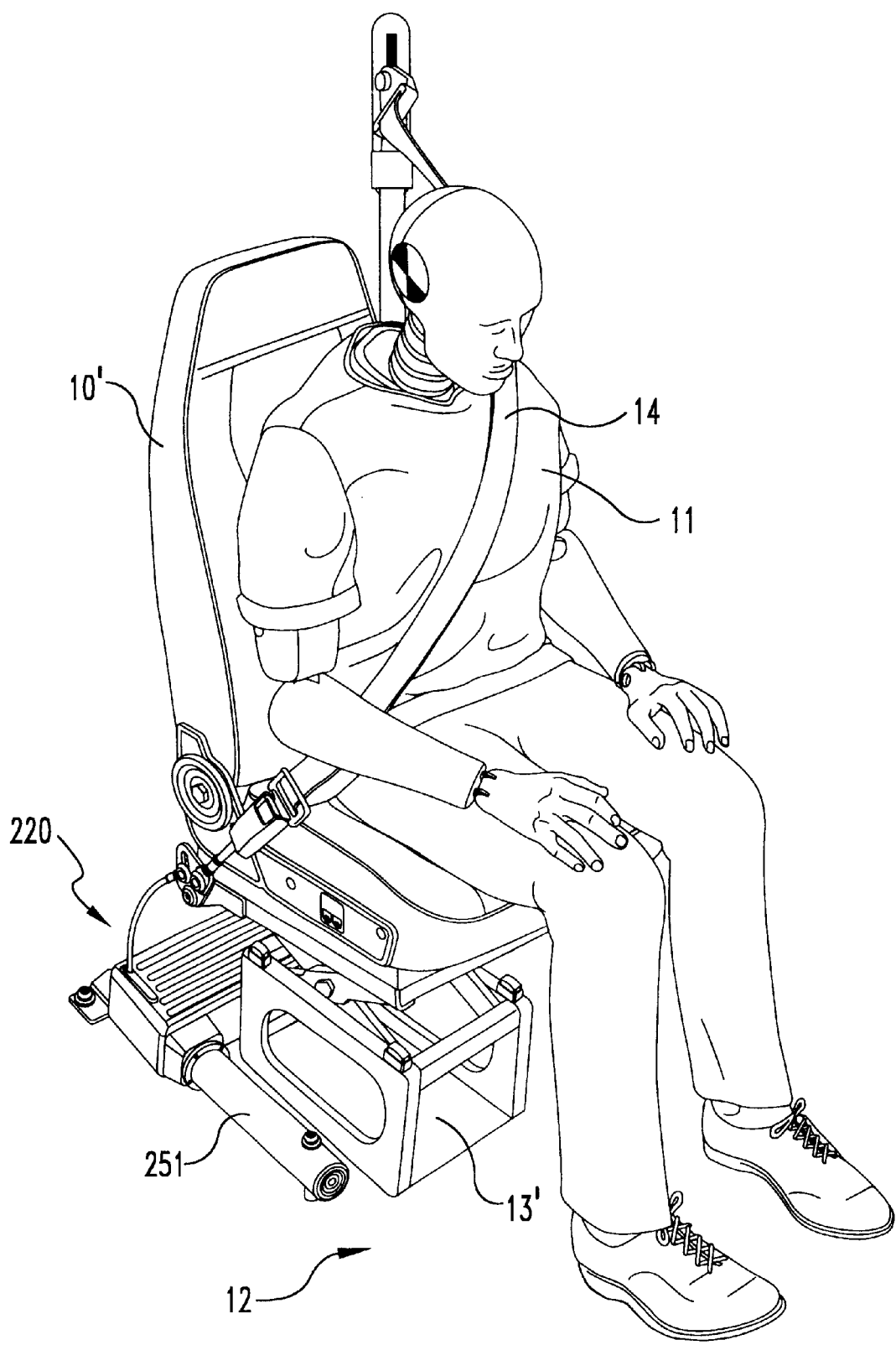
FIG. 10 is a side, perspective view of an second embodiment of the seat incorporating the present invention.

FIG. 10 depicts an alternate typical suspension seat 10' utilized in a heavy truck. Seat 10' is mounted upon housing 13' atop vehicle floor 12. Occupant 11 is secured within the seat by means of a conventional three-point belt assembly 14 as described above. Retracting assembly or means 220, including restraint assembly 251, is operably coupled to suspension seat 10'. Additional embodiments of the seat belt assembly are discussed above and shown in FIGS. 1–3.

Figure 11:
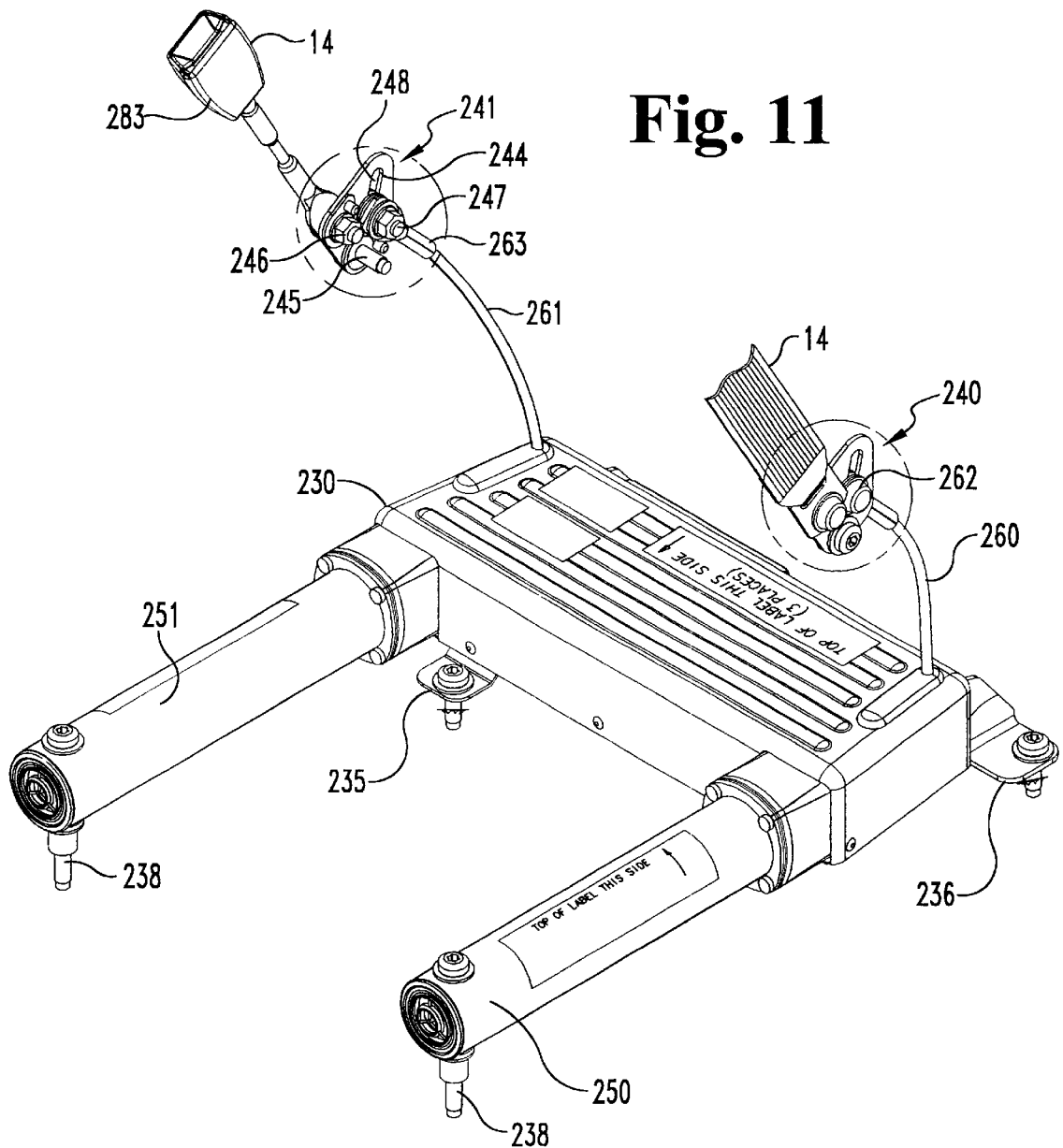
FIG. 11 is a side, perspective enlarged view of the seat retracting assembly used with the embodiment shown in FIG. 10.
Figure 12:
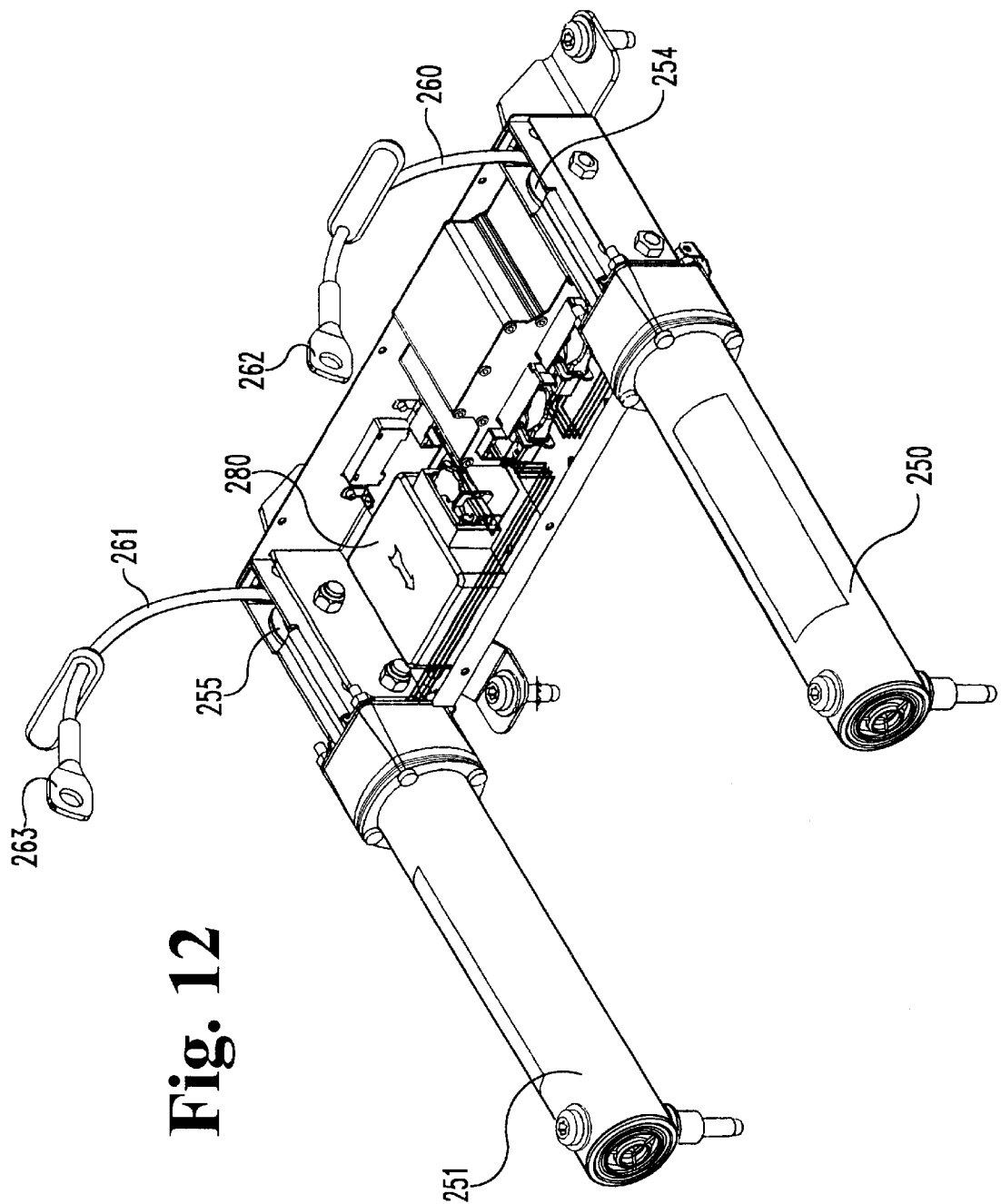
FIG. 12 is a side, perspective enlarged view of the seat retracting assembly of FIG. 11 with the cover removed.

Enlarged, side, perspective views of retracting assembly 220 are illustrated with cover 230 in place in FIG. 11 and with cover 230 removed in FIG. 12. Retracting assembly 220 includes restraint devices or assemblies 250 and 251. Restraint devices 250 and 251 are mounted to a base. Displacement members 260 and 261 have first ends 262 and 263 connected to mounting points on the seat and seat frame via linkages 240 and 241, and second ends connected to pistons in the restraint devices described below.

Alternately, ends 262 and 263 of displacement member 260 and 261 are connected directly to the seat frame of seat 10' without linkages 240 and 241 being provided. In this alternate embodiment, the buckle 283 and belt 14 are also mounted directly to the seat frame, but not necessarily at the same points at the displacement members. When belt 14 and buckle 283 are directly mounted to the seat and seat frame, retracting assembly 220, upon activation, pulls the seat down toward the floor without first tightening the belt assembly.

Preferably displacement members 260 and 261 include at least a flexible portion. Bearings or pulleys 254 and 255 are in contact with displacement members 260 and 261 between the first ends and the second ends. Restraint devices 250 and 251 are identical and thus the following description for restraint device 250 will apply equally to restraint device 251.

Linkage 240 is symmetric to linkage 241. As illustrated in FIG. 11, in linkage 241, first end 263 of displacement member 261 is connected to connector plate 244 with bolt 247 or similar attachment. First end 263 may be fixedly or pivotally attached to connector plate 244, which optionally includes a slot for adjustment. Linkage 241 includes pivot point 245 which is pivotally mounted to the seat and seat frame. Belt assembly 14 is mounted to linkage 241 with bolt 246. During installation linkage 241 is adjusted to the correct position and tension. It will be understood that screws, rivets, or other standard connectors of sufficient strength may be substituted for bolts 246 and 247. Appropriate complementary hardware such as nuts, washers, bushings, and spacers are also included.

Plate 244 is identical to plate 81 except slot 248 is provided and receives bolt 247. Bolt 247 is slidably received within slot 248, and is initially positioned at the slot end closer to pivot point 245. When bolt 247 is initially pulled by displacement member 261, it rotates plate 244 around pivot point 245 until the slack is removed from belt assembly 14. Bolt 247 then slides to the farther slot end of slot 248. This provides a short lever arm to maximize rotation of plate 244 under the relatively light load of removing the slack in belt assembly 14 and the initially slow movement of displacement member 261. The rotation of plate 244 and sliding of bolt 247 also provides greater time between activation and the full load of the seat being pulled by displacement member 261 when the lever arm is eliminated, allowing a greater initial acceleration of displacement member 261.

Retracting assembly 220 is mounted to the vehicle floor using multiple bolts and brackets 236 and 238. A sensor bracket 235 is also bolted to the vehicle floor. Crash sensor 280 is mounted within retracting assembly 220 and is operably coupled (not shown) to restraint devices 250 and 251. Crash sensor 280 may be various standard types of impact, motion, acceleration, rollover or similar sensors as made and sold by various manufacturers. Crash sensor 280 may be mounted elsewhere in the vehicle as preferred, so long as it is operably coupled to restraint devices 250 and 251. In one example, an appropriate sensor is a Bosch A/B 6.2 crash sensor.

Figure 13:
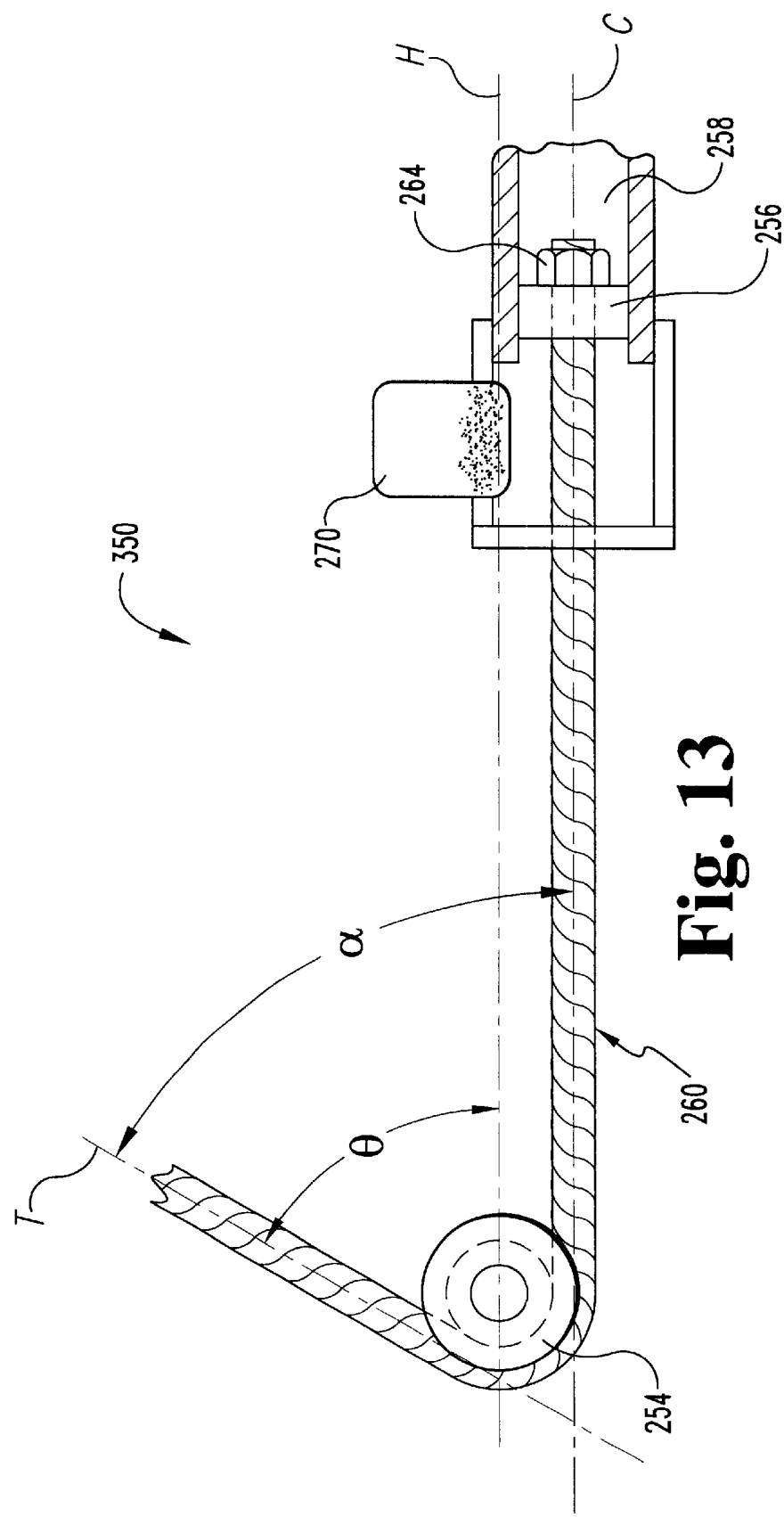
FIG. 13 is a side, cut-away view of a version of a restraint assembly used with the embodiment illustrated in FIG. 12.

A variation of restraint device 250 is shown in a cross-sectional view in FIG. 13. Piston 256 is movably mounted in a longitudinal displacement path within longitudinal fluid cylinder 258. Second end 264 of displacement member 260 is connected to piston 256. A fluid pressure source, such as pyrotechnic charge and container 270 is connected to fluid cylinder 258 and is operably coupled to crash sensor 280. Displacement member 260 extends from fluid cylinder 258 to a bearing or pulley 254 and continues to linkage 240. In one embodiment, displacement member 260 is flexible along the majority of its length. The displacement member can be made from wires, solid metals, alloys, braids, ropes or similar known materials having sufficient longitudinal strength, and includes connection hardware. The fluid pressure source can alternately be pressurized fluid with a mechanical trigger, or can be a hybrid of pressurized fluid and a pyrotechnic charge.

Longitudinal cylinder axis C is defined in a line through fluid cylinder 258 along the displacement path and is aligned with at least a portion of displacement member 260 including second end 264. Tension axis T is defined in a line intersecting linkage 240 and at least a portion of displacement member 260 including first end 262. The intersection of cylinder axis C and tension axis T form angle α (alpha), with bearing or pulley 254 contacting a flexible portion of displacement member 260 to form the angle. Angle α may be between zero (0) and 180 degrees, depending on the orientation of the cylinder.

Horizontal axis H is also illustrated in FIG. 13. In one embodiment horizontal axis H is parallel to cylinder axis C. The angle θ (theta) between horizontal axis H and tension axis T can range from ninety degrees to zero degrees. One preferred range for angle θ is between about 40 and about 70 degrees. An alternate preferred angle θ is ninety (90) degrees. When θ is between zero and ninety degrees a pull-down vector force and a horizontal restraining force is provided on the seat frame. When θ is ninety degrees, a maximum pull-down force is provided.

Imparting an angle to the displacement member allows greater flexibility in the spatial arrangement of the retracting assembly. For example, the fluid cylinders can be mounted substantially horizontally, under the seat and adjacent the frame. Alternately, the displacement members can be doubled back around the pulleys with the cylinders vertically mounted substantially parallel to the seat back. Using different orientations, the required area within a vehicle for mounting the seat and assembly can be minimized. The use of a flexible displacement member minimizes the potential for damaging force to be applied transverse to the cylinder axis and provides an actuator 350 which is adaptable to the particular mounting space in both locations and size.

Figure 14:
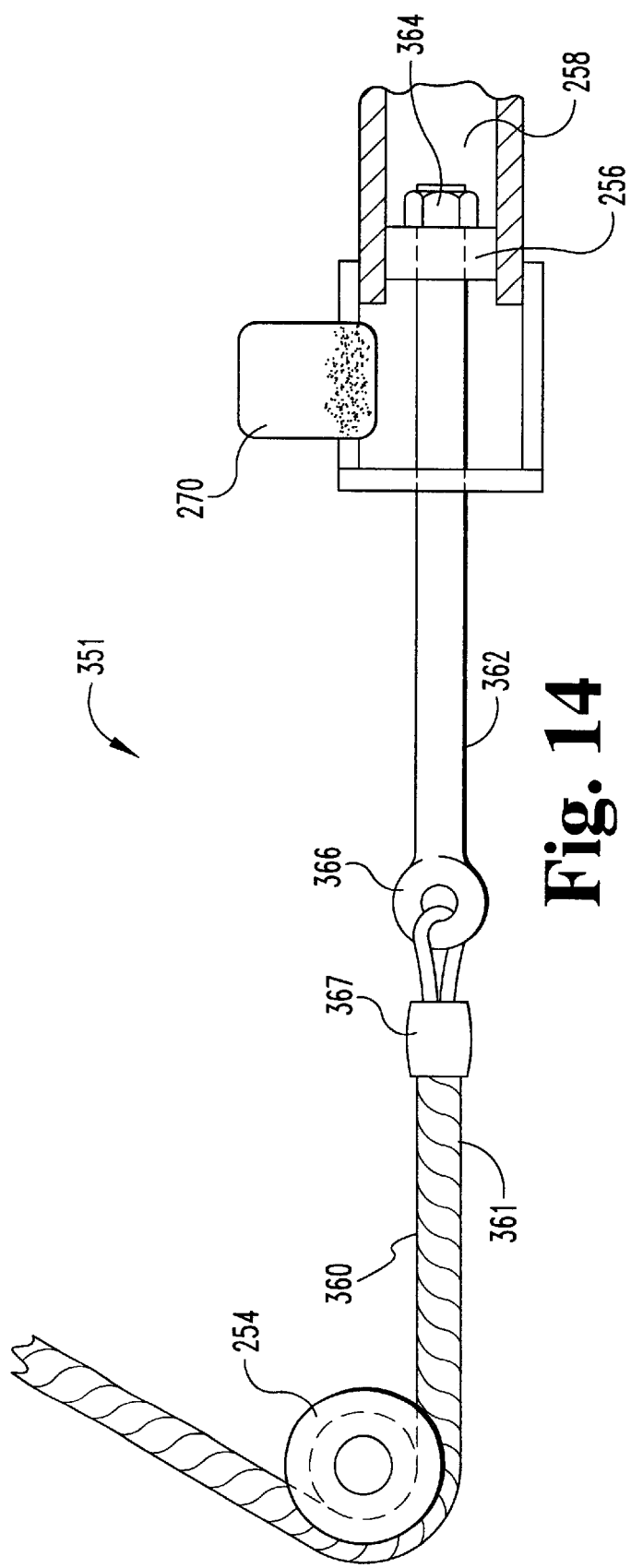
FIG. 14 is a side, cut-away view of an alternate version of a restraint assembly used with the embodiment illustrated in FIG. 12.

An alternate version of restraint device 250 is illustrated in FIG. 14 with restraint device 351. Restraint device 351 functions substantially identically to restraint device 350, but uses displacement member 360. Displacement member 360 has a length with at least a first flexible portion 361 linked to a second portion 362 and extends to the seat mounting point or linkage. Second portion 362 is connected to piston 256 at second end 364. The first or head end 366 of second portion 362 is coupled to the second or tail end 367 of first portion 361. First portion 361 can be a cable, chain or similar flexible material. Second portion 362 is preferably a rod which is attached at one end to the piston, and which has a sufficient length to extend a distance beyond fluid cylinder 258 after the piston is moved along the displacement path. Typical connectors such as rings, eye loops, chain links, welds, or wires may be used to link head end 366 and tail end 367. The displacement member passes through a seal (not shown) when entering the fluid cylinder. Use of rod 362 allows a tight seal at the entry point into the cylinder.

With a similar operation as described above, upon crash, seat-retracting assembly 220 operates to tighten the belt means around the user and move the seat frame and seat towards the vehicle floor. When crash sensor 280 detects an activation event, it sends a signal to pyrotechnic charge 270 attached to restraint assembly 350 or 351. When the pyrotechnic charge is activated, it supplies fluid pressure to the fluid cylinder impelling the piston along the displacement path. The piston transmits the displacement force to the displacement member and by association to linkage 240 and the seat and seat frame. The "pull" of the displacement member tightens the belt by first pivoting the linkage around seat connection 245 and then drawing the seat assembly towards the floor.

Various mechanisms may be used to prevent or impede return travel of the piston within the fluid cylinder. Examples include maintaining fluid pressure, one-way locking clutches, or ratchet mechanisms. Preferably there are restraint assemblies on each of the two lower points of the belt, such as assemblies 250 and 251 or alternately two assemblies 350 or 351. Preferably both assemblies such as 250 and 251 are activated simultaneously.

Figure 15:
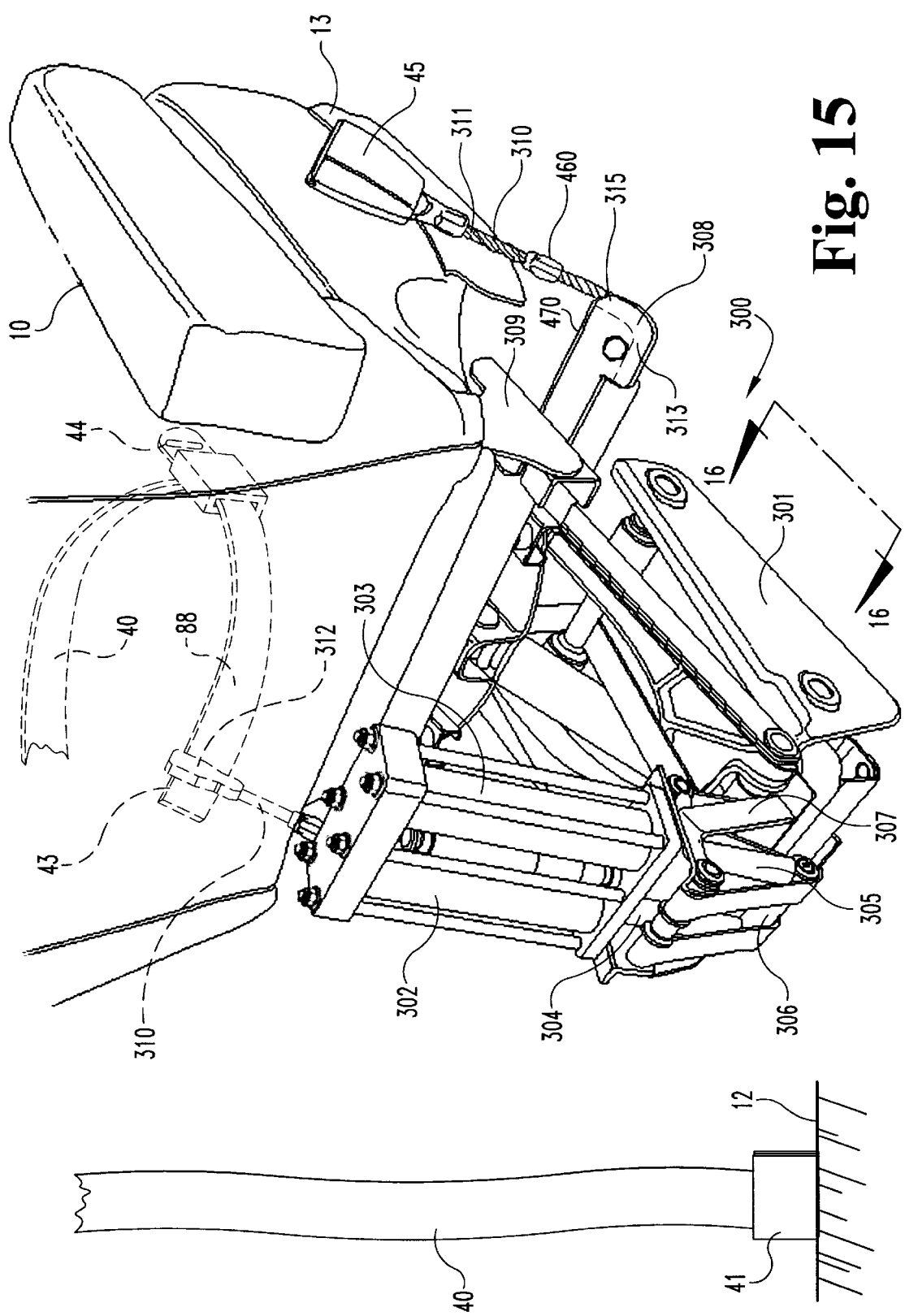
FIG. 15 is a perspective and fragmentary rear view of a seat incorporating the preferred embodiment of the restraint assembly to tighten the belt assembly and move the seat toward the vehicle floor.

The preferred embodiment of the seat and occupant restraint system is shown in FIG. 15 in fragment and includes a conventional three point belt assembly having a belt 40 with one end portion mounted to the spool of a retractor 41 fixedly mounted to the vehicle floor 12 or other suitable location within the vehicle. Seat 10 and the mounting structure within housing 13 is constructed as previously described for the other embodiments. Belt 40 extends upwardly through the D-loop 42 as depicted in FIG. 2 and then downwardly across the shoulder and the front of the seat occupant. A conventional seatbelt tongue or locking device 44 is slidably mounted to belt 40 and is lockingly engageable and matable with buckle 45 mounted to the seat. Belt 40 extends through tongue 44 forming a lap portion 88 extending across the lap of the occupant to the opposite end 43 mounted to the seat.

The preferred embodiment depicted in FIG. 15 includes an actuator 300 having a frame 301 mounted to the floor of the vehicle or other suitable location on the vehicle including a location external of the vehicle cab. A pair of fluid cylinders 302 and 303 are mounted in side-by-side relationship having a pair of extendable piston rods 304 and 305. The distal ends of rods 304 and 305 have a roller cross bar 306 mounted thereto. Cylinders 302 and 303 are mounted by suitable brackets 307 to frame 301.

An ICP bar 308 is fixedly mounted by bolts or other conventional fastening means to the seat frame 309. A flexible cable 310 extends through bar 308 having one end 311 fixedly attached to buckle 45 and opposite end 312 fixedly attached to end portion 43 of the lap portion 88 of belt 40. Cable 310 is continuous between ends 311 and 312 and is slidably mounted and received within bar 308. The opposite ends of the bar includes grooved channels through which the cable is slidable. For example, end 315 of bar 308 has an internal groove 313 slidably receiving and guiding cable 310. The opposite end of the bar (not shown) has a similar groove to receive and guide cable 310 as it extends to end 312.

A pair of flexible members, such as belts, are attached to the center portion of cable 310 and extend rearwardly around the roller crossbar 306. As a result, extension of piston rods 304 and 305 cause outward movement of roller bar 306 thereby pulling the pair of flexible belts, in turn, pulling and retracting cable 310.

Figure 16:
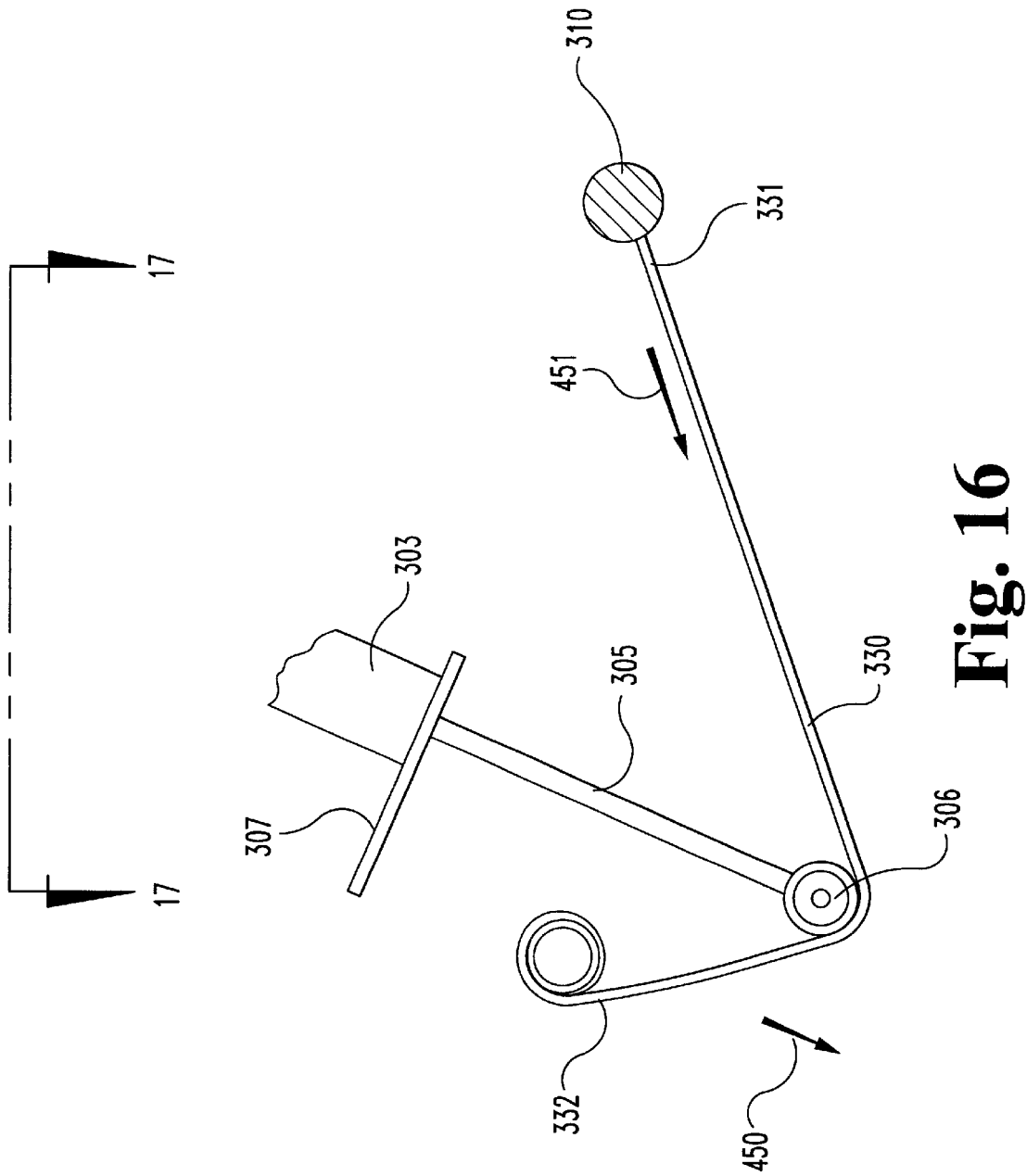
FIG. 16 is a schematic side diagram of the actuator of FIG. 15 looking in the direction of arrows 16—16 of FIG. 15.
Figure 17:
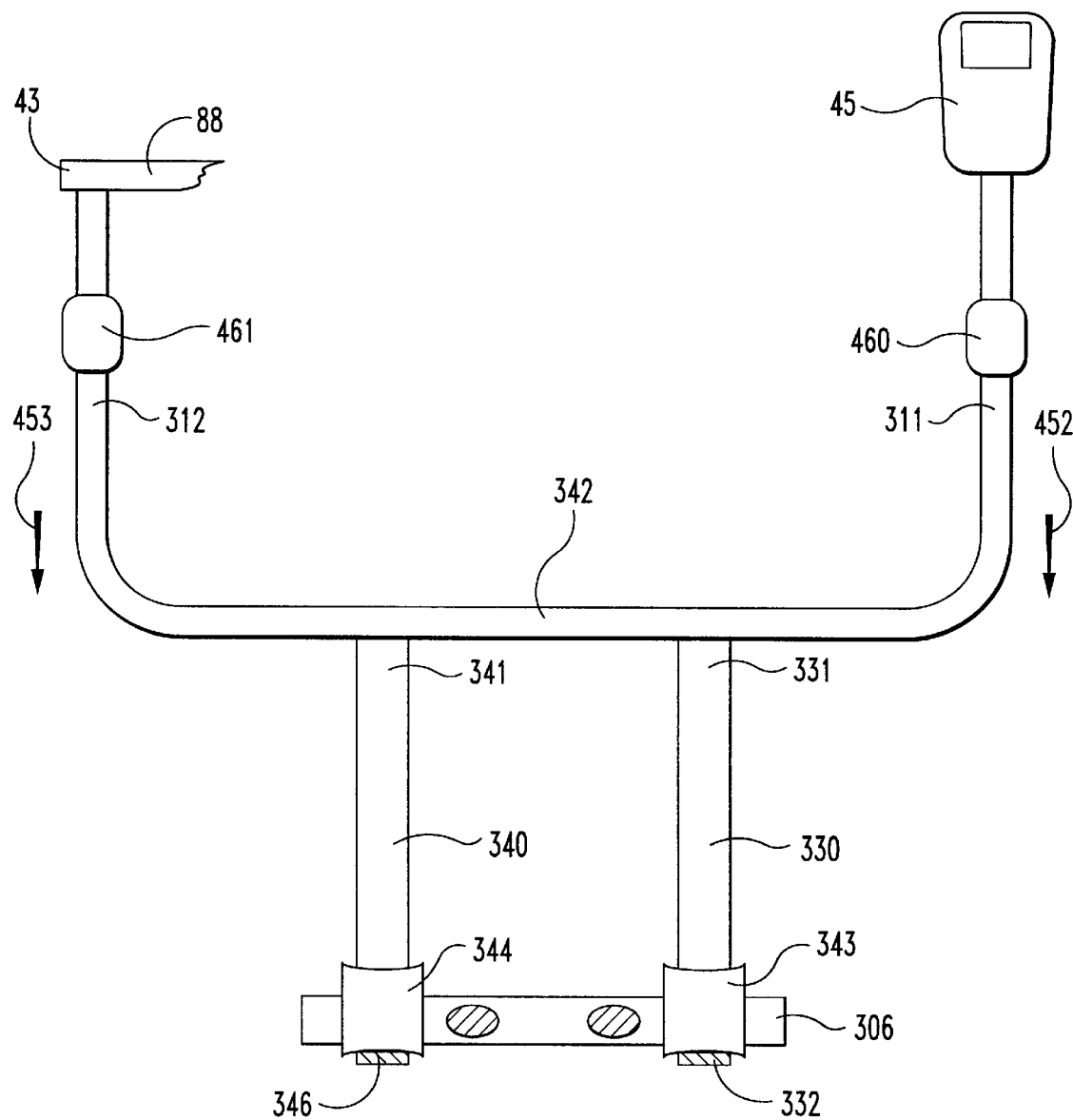
FIG. 17 is a schematic top diagram of the actuator of FIG. 15 looking in the direction of arrows 17—17 of FIG. 16.

FIG. 16 is a schematic diagrams of a side view of the actuator 300 looking in the direction of arrow 16—16 of FIG. 15. FIG. 17 is a schematic diagram looking in a direction of arrows 17—17 of FIG. 16. The pair of flexible belts 330 and 340 have first ends 331 and 341 fixedly attached to the center portion 342 of cable 310. Ends 311 and 312 of cable 310 are attached respectively to buckle 45 and end portion 43 of the lap portion 88 of belt 40. Belts 330 and 340 extend slidably around a pair of rollers 343 and 344 provided on roller crossbar 306. The end portions 332 and 346 of respectively belts 330 and 340 are then fixedly attached to the frame 307. Extension of piston rods 304 and 305 of cylinders 302 and 303 cause movement of roller crossbar 306 in the direction of arrow 450 thereby forcing belts 330 and 340 downwardly as viewed in FIG. 16 and pulling cable 310 in the direction of arrow 451. A suitable opening is provided in bar 308 to allow belts 330 and 340 to extend therein being fixedly attached to the center portion 342 of cable 310. Movement of the center portion 342 of belt 310 in the direction of arrow 451 causes end portions 311 and 312 of cable 310 to move in the direction of arrows 452 and 453 (FIG. 17) thereby pulling buckle 45 and end portion 43 of belt 40 downwardly tightening the belt. A pair of optional bushings or stops 460 and 461 may be fixedly mounted respectively to ends 311 and 312 of cable 310 and interferingly contact bar 308 when the cable has been sufficiently moved in the direction of arrows 452 and 453 thereby preventing further tightening of the belt assembly. For example, edge 470 of bar 308 contacts bushing 460 preventing further retraction of the cable into bar 308 in the direction of arrow 452. Alternatively, bar 308 contacts the mount of cable ends 311 and 312 if bushing 460 and 461 are not utilized. Continued extension of piston rods 304 and 305 will cause belts 330 and 340 to apply further outward pressure to cable 310 which, in turn, transfers the downward pressure to bar 308 and the attached seat frame. As a result, upon crash and activation of cylinders 302 and 303, the piston rods 304 and 305 will be extended forcing belts 330 and 340 downwardly in the direction of arrow 450 thereby pulling cable 310 in the direction of arrow 451 tightening the belt until bushings 460 and 461 or mounts on ends 311 and 312 contact bar 308 at which time the belt will remain tightened while the seat is pulled downwardly as piston rods 304 and 305 are extended.

The actuator of FIG. 15 is an occupant pre-tensioner and seat pull down device that uses either stored fluid, for example, a gas, or pyrotechnic material to provide potential energy. The potential energy is converted to kinetic energy via a centrally located piston/cylinder or a fluid powered rotary spooler, for example, a gas powered rotary spooler. That is, once the vehicle sensor senses a crash, such as, a roll over or sudden change in velocity, the source of stored fluid or pyrotechnic material is activated causing extension of piston rods 304 and 305. In lieu of utilizing cylinders 302 and 303, the present invention contemplates the use of a fluid powered rotary spooler for rolling in and retracting belts 330 and 340 upon crash. The power delivered by the cylinders or rotary spooler is delivered to the seat and occupant via a flexible fabric tether or belts 330 or 340. The present invention includes transmission of the power via a cable or cables in lieu of belts 330 or 340. In either case, the tether terminates at the center of the ICP bar 308 and is connected to a cable that passes through the hollow bar. By pulling on the center of the cable 308, the ends of the cable are retracted into the bar causing pre-tensioning of the occupant by an amount that is determined by the position of the end fitting or bushings 460 and 461. Once the end fittings have contacted the hard stops on the ends of bar 308, the seat pull down begins.

The present invention includes the use of a powered piston cylinder actuator using a web serpentine or a fluid powered rotary spooler. Both function as a peak load limitor as the fluid or gas is compressed during impact. By maintaining the pressure within cylinders 302 and 303 upon crash, the piston rods 304 and 305 are locked in the outer position preventing payback on deceleration. A particular advantage of the flexible tethers 330 and 340 is the reduction of shock imparted to the occupant upon activation and deceleration due to their elastic properties.

Figure 18:
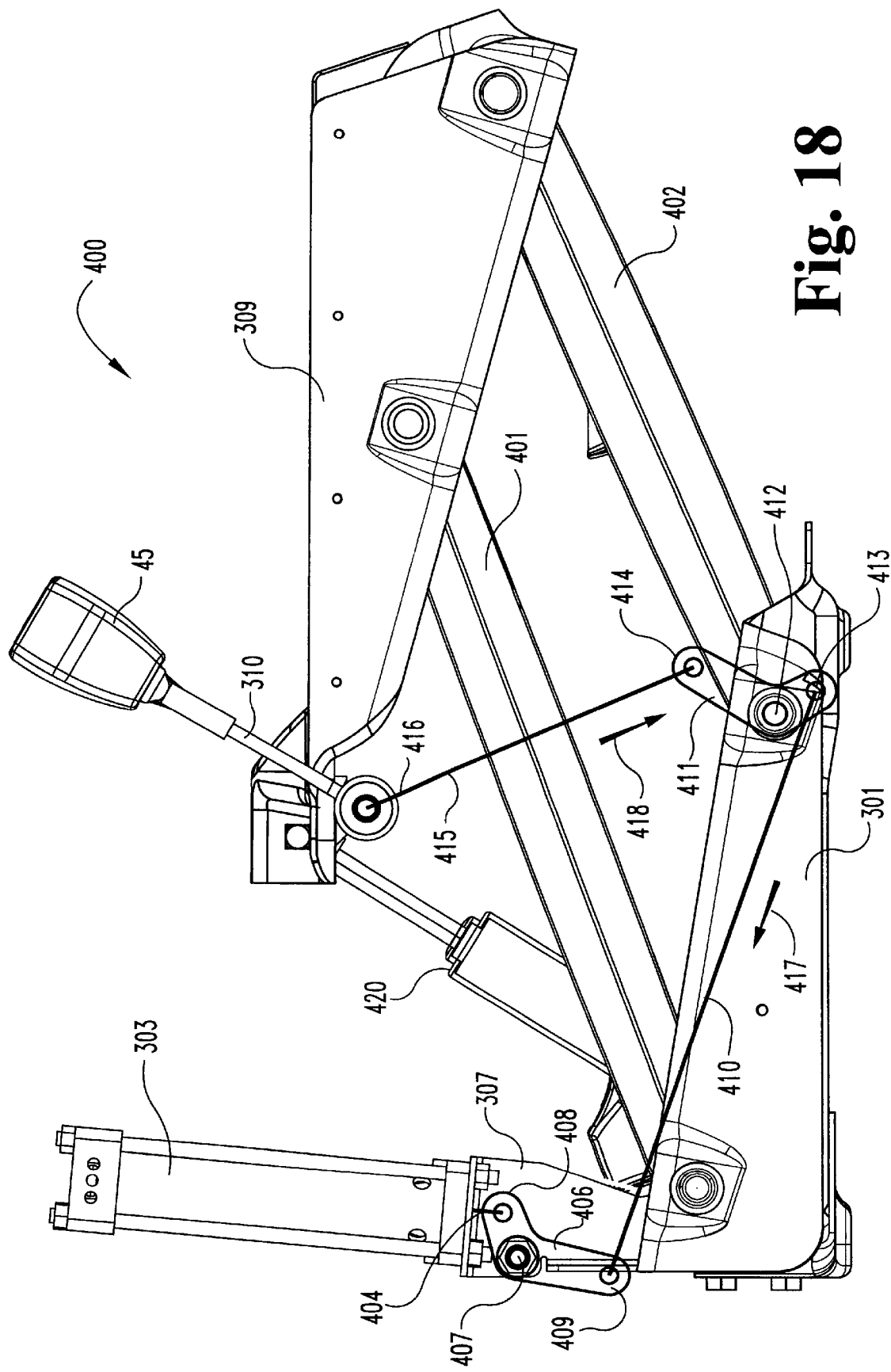
FIG. 18 is schematic side diagram of alternate version A of the restraint assembly of FIG. 15 with the seat suspension shown in the full-up and in the pre-deployment condition.
Figure 19:
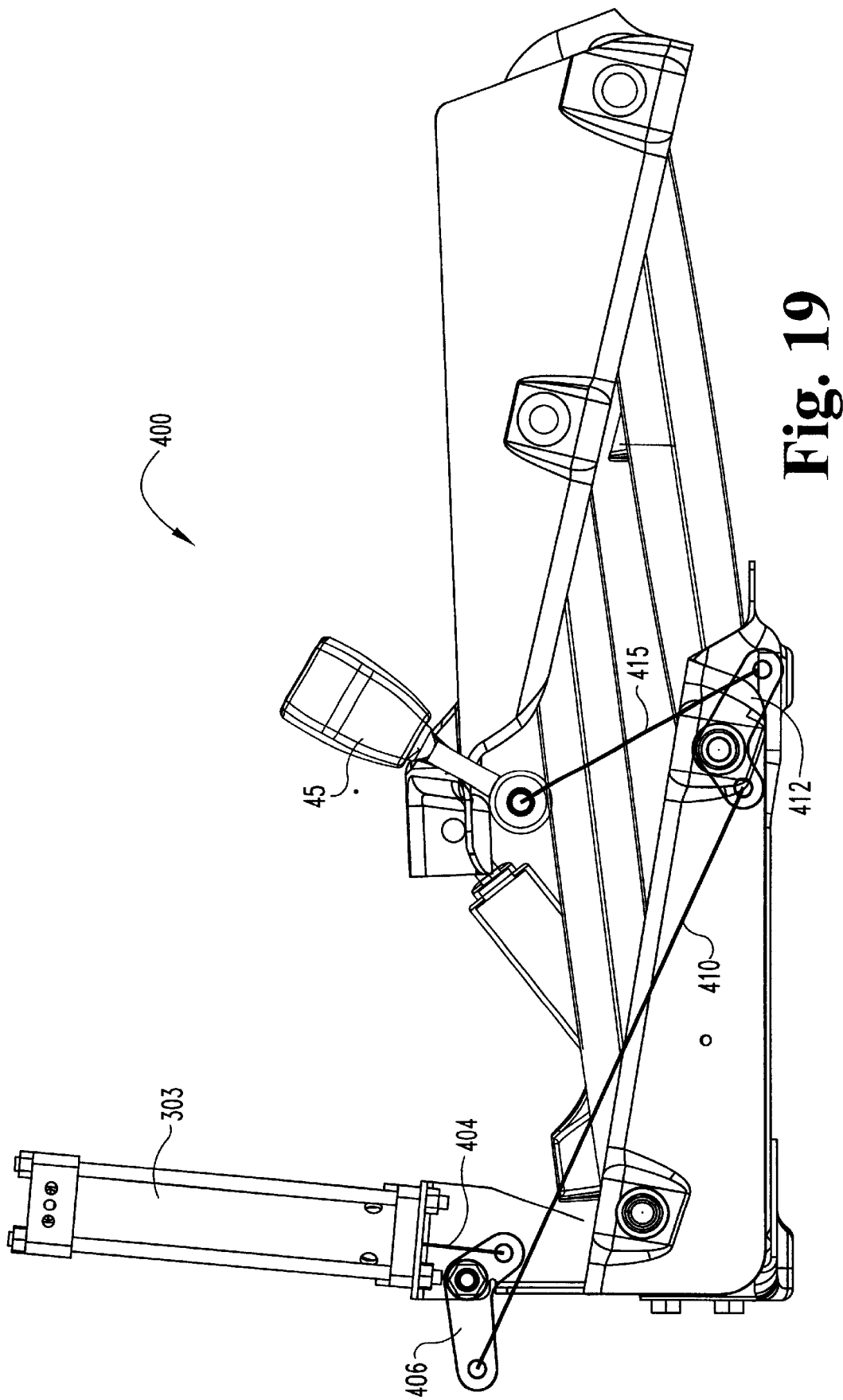
FIG. 19 is the same view as FIG. 18 only showing the seat suspension in the full-down position and in the post-deployment condition.
Figure 20:
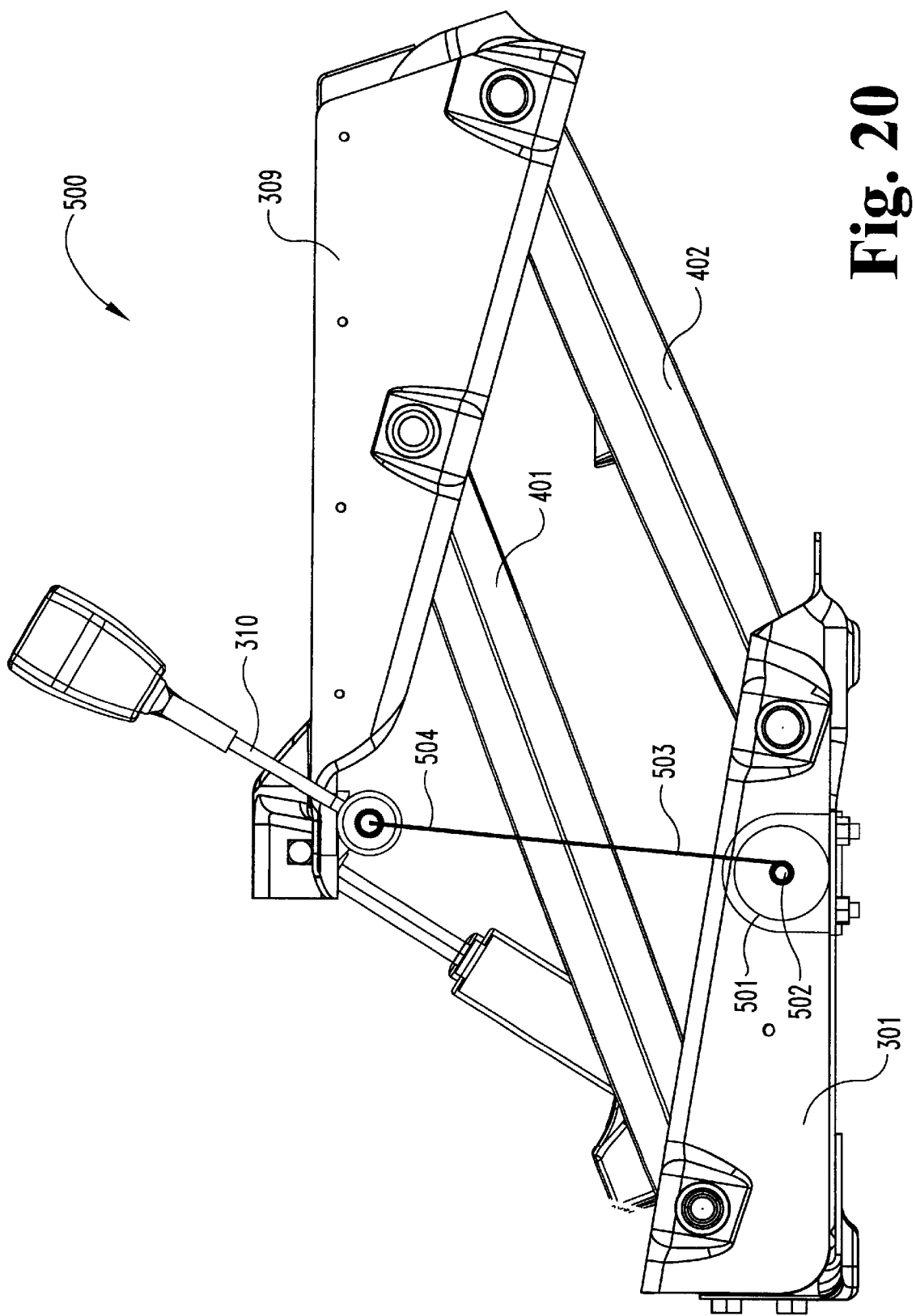
FIG. 20 is schematic side diagram of alternate version B of the restraint assembly of FIG. 15 with the seat suspension shown in the full-up and in the pre-deployment condition.
Figure 21:
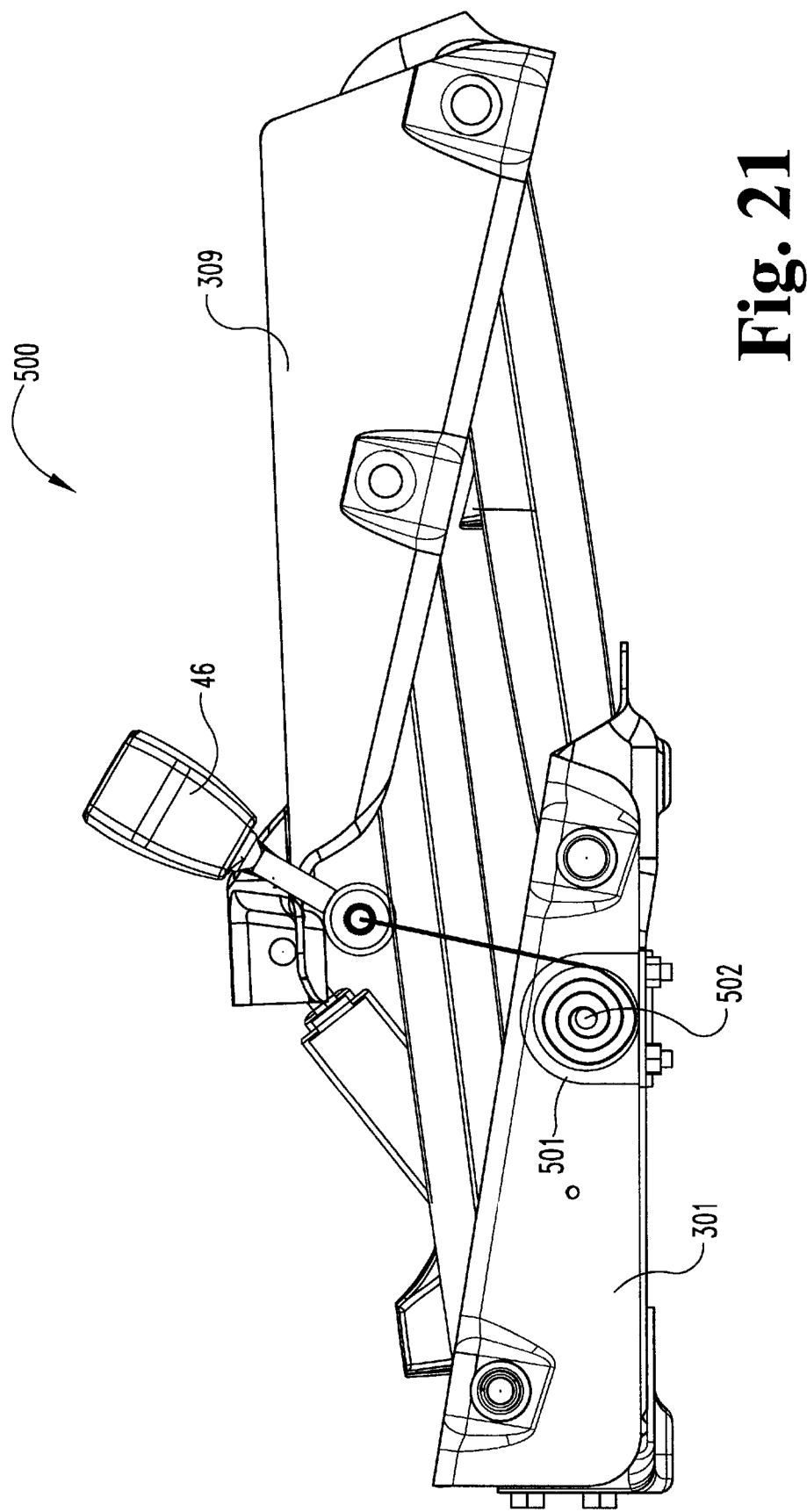
FIG. 21 is the same view as FIG. 20 only showing the seat suspension in the full-down position and in the post-deployment condition.
Figure 22:
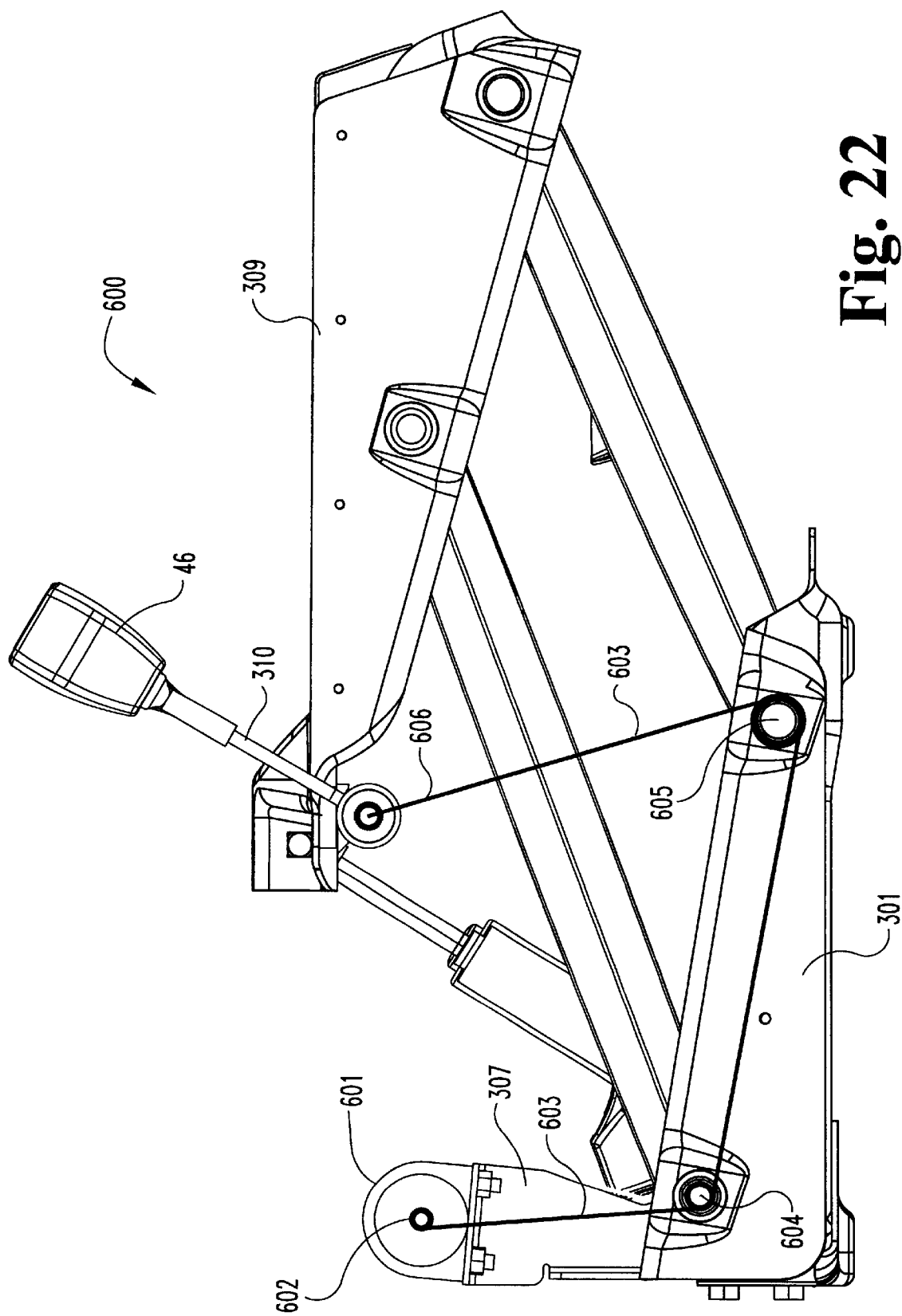
FIG. 22 is schematic side diagram of alternate version C of the restraint assembly of FIG. 15 with the seat suspension shown in the full-up and in the pre-deployment condition.

Three variations of actuator 300 are depicted in FIGS. 18, 20 and 22 and are shown in the full-up position and the pre-deployment condition. The three versions are shown respectively in FIGS. 19, 21 and 23 in the full-down position and the post-deployment condition. In all three versions, the seat frame 309 and base frame 301 are secured together by arms 401 and 402 in a manner identical to seat frame 36 and base frame 35 (FIG. 3) by arms 33 and 34. Likewise, a suitable suspension means, such as an air bag, is located between seat frame 309 and base frame 301 as previously described for the embodiments shown in FIGS. 2 and 3. The air bag has been omitted from FIGS. 18–23 in order to clearly depict the remaining structure. Likewise, in all three versions, the belt assembly consisting of a three point belt, a retractor, tongue 44 and buckle 45 is identical in configuration and mounting as described for the system shown in FIG. 15.

Figure 23:
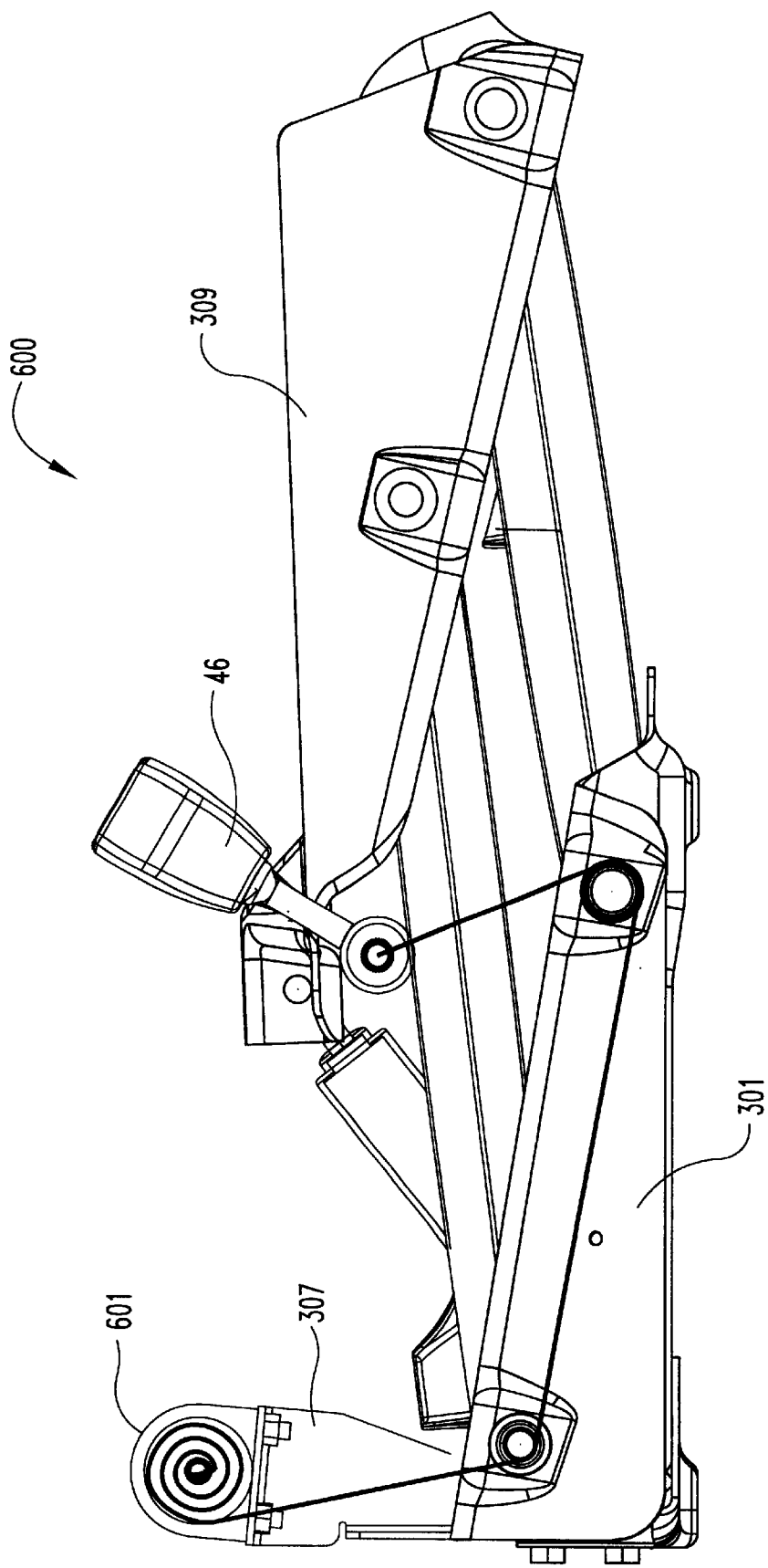
FIG. 23 is the same view as FIG. 22 only showing the seat suspension in the full-down position and in the post-deployment condition.

Version A in FIGS. 18 and 19 utilizes crank linkages and rods to tighten the seatbelt and pull the seat downwardly whereas version B in FIGS. 20 and 21 and version C in FIGS. 22 and 23 utilize an actuator having a rotary output connected by flexible members, such as, cables to tighten the seatbelt and then pull the seat downwardly.

Version A of the actuator in FIGS. 18 and 19 is identical to actuator 300 previously described with exception that crank linkages and inner-connecting rods are utilized in lieu of the belts 330 and 340 of actuator 300. Thus, a pair of fluid cylinders 302 and 303 are mounted to bracket 307, in turn, mounted to frame 301. FIGS. 18 and 19 are side views and thus depict only cylinder 303. Each cylinder has a outwardly extendable rod 404 pivotally connected to arm 408 of crank linkage 406, in turn, pivotally mounted by fastener 407 to bracket 307. The opposite end 409 of linkage 406 is pivotally connected to one end of rod 410 having its opposite end pivotally mounted to arm 413 of crank linkage 411, in turn, pivotally mounted by fastener 412 to base 301. The opposite end 414 of linkage 411 is pivotally connected to rod 415 having its opposite end 416 secured to the middle portion 342 (FIG. 17) of cable 310. Likewise, cylinder 302 has an extendable rod connected via a pair of crank linkages identical to linkages 406 and 411 and a pair of rods identical to rods 410 and 415 to the middle portion 342 of cable 310 mounted to the ICP bar 308. Cable 310 extends through the ICP bar to buckle 45 and end 43 (FIG. 15) of lap portion 88 of belt 40 as previously described. Seat frame 309 is pivotally mounted to the top end of arms 401 and 402, in turn, having their bottom ends pivotally mounted to frame 301 allowing the seat to move back and forth between the full-up position and the full-down position.

Upon activation of cylinders 303 and 304, the piston rods extend thereby tightening belt 40 and then pulling the seat downwardly. For example, activation of cylinders 303 results in extension of rod 404 and the clockwise movement of linkage 406 as viewed in FIG. 18 causing rod 410 to move in a direction of arrow 417. Linkage 412 is thereby caused to rotate in the clockwise direction as viewed in FIG. 18 to the position shown in FIG. 19 pulling rod 415 downwardly in the direction of arrow 418 thereby pulling the middle portion 342 of cable 310 outwardly from the ICP bar 308. Buckle 45 and belt end 43 are pulled downwardly pretensioning the seatbelt until contact is made between the ICP bar 308 (FIG. 15) and the bushings 460 and 461 (FIG. 17) or the mount for buckle 45 and the belt end 43 with further extension of the piston rods pulling the seat toward the vehicle floor. A conventional shock-absorbing cylinder 420 is shown in the extended position in FIG. 18 and in the collapsed position in FIG. 19. The base of cylinder 420 is mounted to frame 301 whereas the distal end of the extendable rod is connected to seat frame 309.

In lieu of utilizing fluid cylinders 302 and 303 to pretension the seatbelt and pull the seat downwardly, version B (FIGS. 20 and 21) and version C (FIGS. 22 and 23) of the actuator utilize a pair of rotary spoolers having cables attached to the middle portion of cable 310 extending through the ICP bar 308.

Actuator 500 includes a pair of rotary spoolers connected by a flexible cable to the middle portion 342 of cable 310. Only a single rotary spooler is shown in FIGS. 20 and 21 since the views are side views. Rotary spooler 501 is mounted to frame 301 and has a rotary output shaft 502 connected to one end of cable 503, in turn, having an opposite end 504 connected to middle portion 342 (FIG. 17) of cable 310 provided in the ICP bar. Once crash sensor 80 has detected a change in motion resulting from a crash or a roll over event, the sensor provides a signal via conventional circuitry to the fluid powered rotary spooler 501 resulting in rotation of output 502 wrapping cable 503 thereon (FIG. 21) and pulling the cable 503 downwardly. Simultaneously, the middle portion 342 of cable 310 is pulled outwardly from the ICP bar tightening the seat belt to the point where edge 470 of the ICP bar (FIG. 15) contacts bushings 460 and 461 or the mounts provided for buckle 45 and belt end 43. Continued rotation of output 502 causes seat frame 309 to move from the upward position in FIG. 20 to the downward position of FIG. 21.

Actuator 600 is identical to actuator 500 except the pair of rotary side-by-side spoolers replacing cylinders 302 and 303 are mounted to bracket 307 fixed to frame 301. Thus, actuator 600 has a pair of rotary spoolers one of which is depicted in FIGS. 22 and 23. Spooler 601 has a rotary output 602 attached to a flexible cable 603. Cable 603 extends around grooved member 604 and 605 mounted to frame 301 with the top end 606 of cable 603 attached to the middle portion 342 of cable 310 mounted in the ICP bar. Operation of actuator 600 is identical to the operation of actuator 500 with the only difference being the location and mounting of the rotary spoolers. Actuator 500 has the pair of rotary spoolers 501 located beneath the seat and within frame 301 whereas the pair of rotary spoolers 601 of actuator 600 are located above frame 301 and to the rear frame 309. Thus, actuators 500 and 600 are adaptable to the particular space and location of the seating arrangement. That is, the size and location of seat mounts will vary depending upon the particular vehicle and seat with the actuator disclosed herein being adaptable or changeable to fit the particular mounting requirement.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A seat restraint system mountable to a vehicle comprising:

a seat;

a suspension for mounting said seat to a vehicle floor operable to allow said seat to move to and from the vehicle floor;

belt means mounted to said seat and operable to restrain an occupant on said seat, said belt means includes a belt with a first end portion and a second end portion with a first locking device mounted therebetween and to said belt, said belt means further including a second locking device lockingly engageable and mateable with said first locking device;

a connector mounted to said seat and connected to said belt and said second locking device, said connector is a cable slidably mounted to said seat with opposite ends connected to said first end portion and said second locking device; and, a seat retractor having a flexible portion connected in sequence to said connector between said opposite ends of said cable and operable to tighten said belt and move said seat toward the vehicle floor upon crash, said seat retractor includes a device with a rotary output connected to said flexible portion.

2. The seat restraint system of claim 1 wherein:

said seat retractor includes a fluid cylinder with an extendable rod connected to said flexible portion.

3. A seat restraint system mountable to a vehicle comprising:

a seat mountable to a vehicle floor and being movable to and from the vehicle floor;

a belt assembly mountable to said seat to restrain an occupant on said seat, said belt assembly including a retractor and a belt with a lap portion with a first end and a first locking device mounted to said belt between said retractor and said first end, said assembly further including a second locking device lockingly engageable and mateable with said first locking device;

a bar mounted to said seat;

an interconnecting flexible device mounted to said seat, said interconnecting flexible device is slidably mounted to said bar, said flexible device connected to said second locking device and to said first end of said lap portion, said flexible device and said belt assembly including a stop to limit movement of said flexible device relative to said bar;

a retracting device; and, a flexible element connected between said retracting device and said flexible device and to said flexible device between said second locking device and said first end of said lap portion with said flexible device being continuous between said second locking device and said first end of said lap portion to pull said flexible device tightening said belt assembly until said stop limits further movement of said flexible device with further pulling of said flexible device by said retracting device moving said seat toward the vehicle floor upon crash.

4. The system of claim 3 wherein:

said retracting device connected to said interconnecting flexible device tightens said belt prior to moving said seat toward the vehicle floor upon crash.

5. The system of claim 3 wherein:

said interconnecting flexible device is a cable mounted to said seat.

6. The system of claim 3 wherein:

said retracting device includes a cylinder with an cylinder rod, a movably mounted member connected to said cylinder rod, and an extension rod connected to and between said movably mounted member said interconnecting flexible device with movement of said cylinder rod moving said movably mounted member, said extension rod and said interconnecting flexible device to tighten said belt.

7. The system of claim 3 wherein:

said retracting device has a rotary output and a second flexible device connected to said rotary output and to said interconnecting flexible device, said retracting device rotating said rotary output in a first direction winding up said second flexible device to pull said seat downwardly toward the vehicle floor upon crash.

8. The system of claim 7 wherein:

rotation of said rotary device in said first direction pulls said interconnecting device to tighten said belt and then pull said seat downwardly toward the vehicle floor upon crash.

9. The system of claim 8 wherein:

said retracting device includes a guide with said second flexible device slidably mounted thereon allowing said rotary device to be located remotely from said seat.

10. A seat restraint system mountable to a vehicle comprising:

a seat;

a suspension for mounting said seat to a vehicle floor operable to allow said seat to move to and from the vehicle floor;

a cable guide mounted to said seat;

a belt assembly mounted to said seat and operable to restrain an occupant on said seat, said assembly includes a belt with a first end portion and a second end portion to form a lap portion with a first lap end, said assembly further includes a first lock and a second lock lockingly engageable and mateable with said first lock, said first lock mounted to said belt between said first end portion and said second end portion, said second lock mounted to said seat;

an interconnecting flexible device mounted to said seat, said interconnecting flexible device is a cable mounted to said cable guide, said belt assembly including a stop to limit movement of said cable relative to said cable guide, said cable connected to said second lock and to said first lap end and being continuous therebetween;

a seat retractor assembly; and, a flexible portion connected in sequence between said seat retractor assembly and said cable and between said second lock and said first lap end to tighten said belt assembly until said stop contacts said cable guide and to also move said seat toward the vehicle floor upon crash, said retractor assembly further including a power cylinder with an extendable piston rod, a pivotally mounted arm connected to said piston rod, and a rigid extension rod movably connected to said arm and said flexible portion.

11. The seat restraint system of claim 10 wherein:

said flexible portion is attached to said belt assembly with said seat retractor assembly pulling and tightening said belt assembly prior to pulling said seat toward the vehicle floor upon crash.

12. The seat restraint system of claim 11 wherein:

said flexible portion is a cable attached to said belt and said second lock.

* * * * *